United States Patent
Lee et al.

(10) Patent No.: US 9,412,001 B2
(45) Date of Patent: Aug. 9, 2016

(54) METHOD AND COMPUTER-READABLE RECORDING MEDIUM FOR RECOGNIZING OBJECT USING CAPTURED IMAGE

(71) Applicant: Samsung Electronics Co., Ltd., Gyeonggi-do (KR)

(72) Inventors: Ki-Huk Lee, Gyeonggi-do (KR); Kyung-Hee Lee, Gyeonggi-do (KR); Chang-Ryong Heo, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 42 days.

(21) Appl. No.: 14/306,651

(22) Filed: Jun. 17, 2014

(65) Prior Publication Data
US 2015/0063661 A1    Mar. 5, 2015

(30) Foreign Application Priority Data
Sep. 3, 2013 (KR) .................. 10-2013-0105519

(51) Int. Cl.
| | | |
|---|---|---|
| G06K 9/62 | (2006.01) | |
| G06K 9/00 | (2006.01) | |
| G06F 3/01 | (2006.01) | |
| G06F 3/03 | (2006.01) | |
| G06K 9/22 | (2006.01) | |

(52) U.S. Cl.
CPC .......... *G06K 9/00013* (2013.01); *G06F 3/011* (2013.01); *G06F 3/014* (2013.01); *G06F 3/017* (2013.01); *G06F 3/0304* (2013.01); *G06K 9/00375* (2013.01); *G06K 9/00671* (2013.01); *G06K 9/228* (2013.01)

(58) Field of Classification Search
None
See application file for complete search history.

(56) References Cited

U.S. PATENT DOCUMENTS

| | | | | |
|---|---|---|---|---|
| 7,148,913 B2* | 12/2006 | Keaton | ............ | G06F 3/011 348/169 |
| 8,179,604 B1 | 5/2012 | Prada Gomez et al. | | |
| 8,515,185 B2 | 8/2013 | Lee et al. | | |
| 2004/0218474 A1* | 11/2004 | Yamazaki | ............ | G04B 47/00 368/82 |
| 2012/0075168 A1* | 3/2012 | Osterhout | ............ | G02B 27/017 345/8 |
| 2012/0162403 A1 | 6/2012 | Bae et al. | | |
| 2013/0044356 A1 | 2/2013 | Lee | | |

FOREIGN PATENT DOCUMENTS

| | | |
|---|---|---|
| KR | 10-2012-0127571 A | 11/2012 |
| KR | 10-2013-0020072 A | 2/2013 |
| WO | 2013/093906 A1 | 6/2013 |

OTHER PUBLICATIONS

Cullen Jennings, Robust Finger Tracking with Multiple Cameras. Recognition, Analysis, and Tracking of Faces and Gestures in Real-Time Systems, 1999. International Workshop on Corfu, Greece, Sep. 26-27, 1999, Los Alamitos, CA, U.S., IEEE Comput. Soc, U.S., pp. 152-160, XP010356542.

Aramis: Toward a Hybrid Approach for Human-Environment Interaction. Stefano Carrino, Elena Mugellini, Omar Abou Khaled, & Rolf Ingold, pp. 165-174, Jan. 1, 2011. Springer-Verlag Berlin Heidelberg.

Augmediated Reality System Based on 3D Camera Selfgesture Sensing. Raymond Lo, Alexander Chen, Valmiki Rampersad, Jason Huang, Han Wu, & Steve Mann. pp. 20-31, Jun. 27, 2013. IEEE International Symposium on Technology and Society.

* cited by examiner

*Primary Examiner* — Brian P Werner
(74) *Attorney, Agent, or Firm* — Cha & Reiter, LLC.

(57) ABSTRACT

A system recognizes an object employed by an electronic device, by capturing an image using a camera module and transmitting information recognized from the captured image to an external electronic device connected with the electronic device via a communication network. The system receives information associated with the recognized information from the external electronic device and displays the received information on a display.

10 Claims, 21 Drawing Sheets

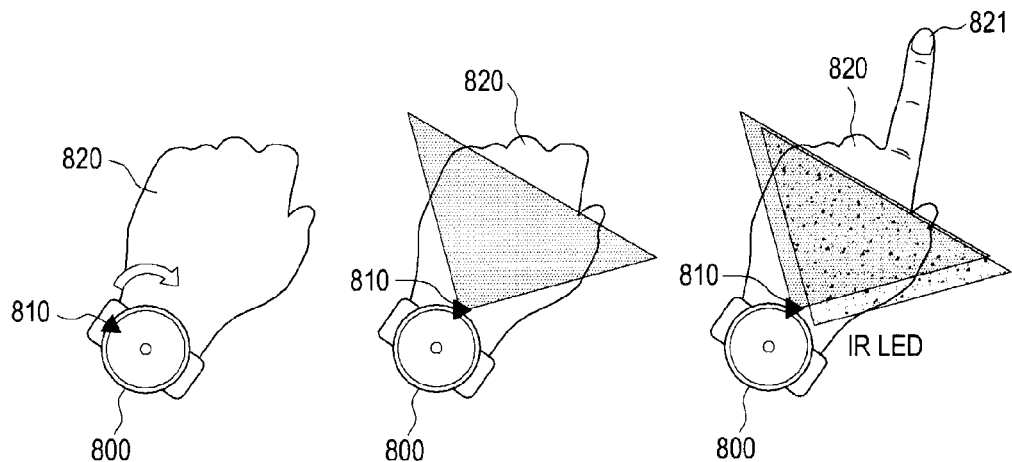
FIG.8  FIG.9  FIG.10
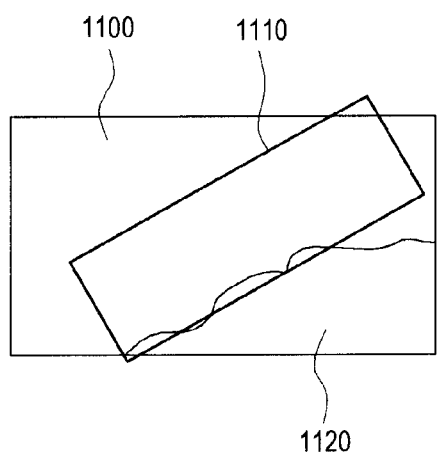
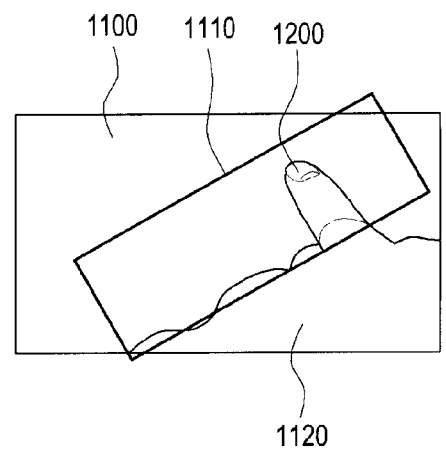
FIG.11  FIG.12

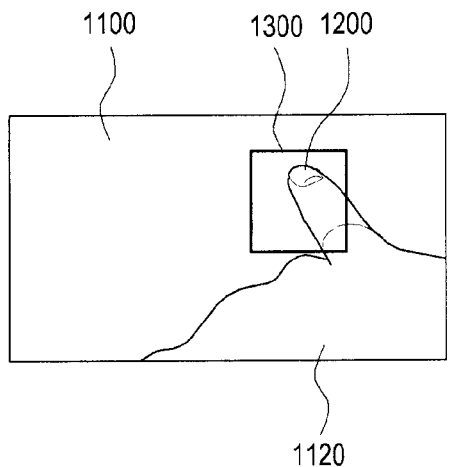 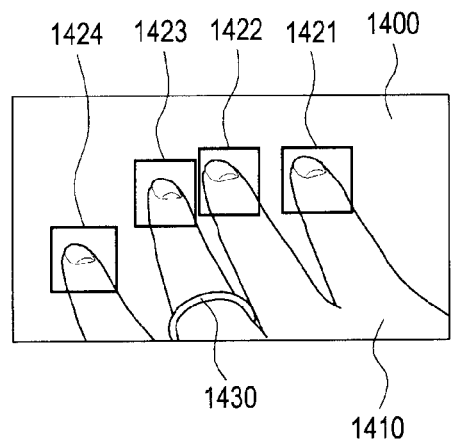
FIG.13    FIG.14
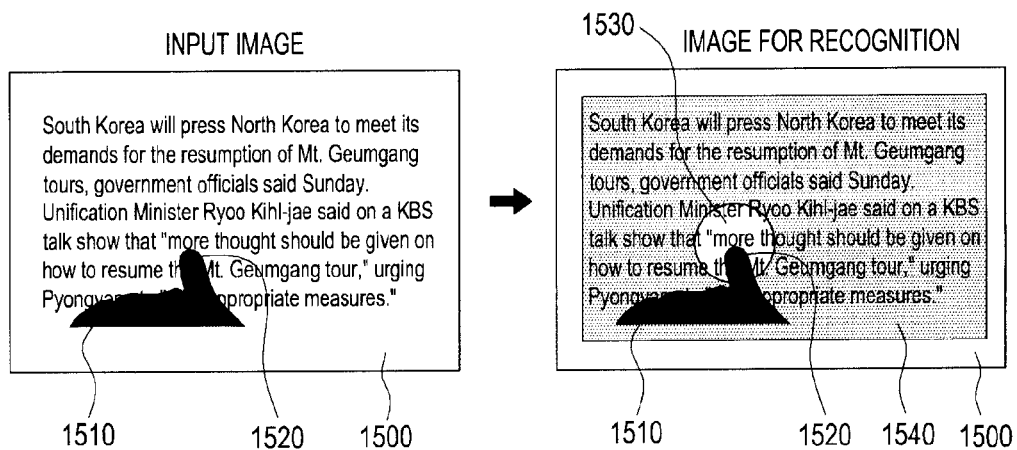
FIG.15

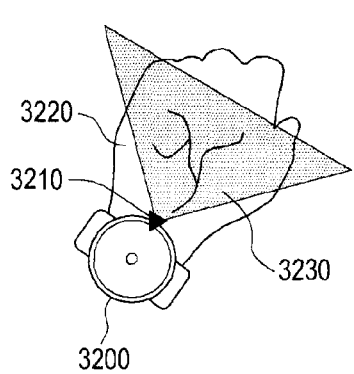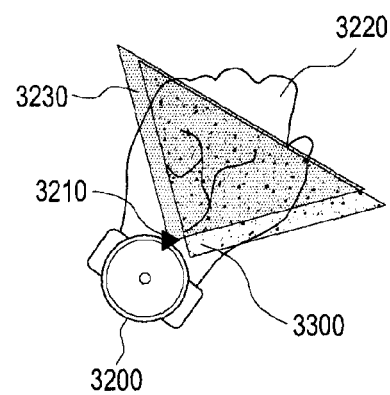
FIG.32  FIG.33
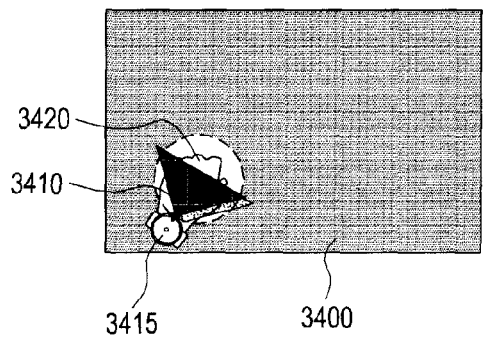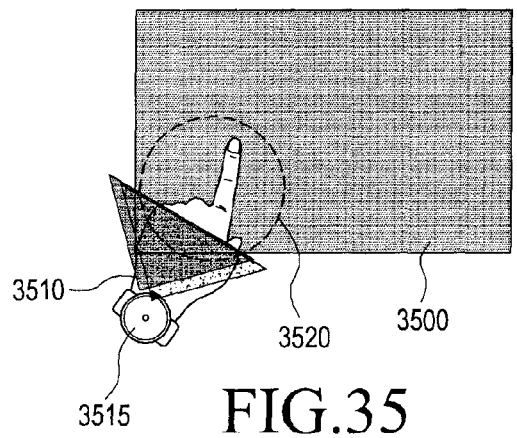
FIG.34  FIG.35
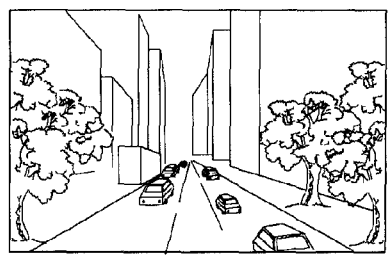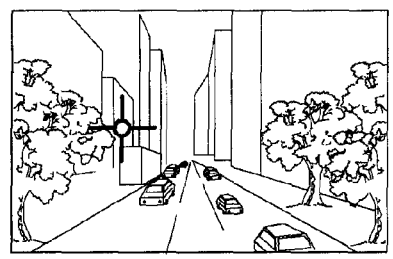
FIG.36  FIG.37

METHOD AND COMPUTER-READABLE RECORDING MEDIUM FOR RECOGNIZING OBJECT USING CAPTURED IMAGE

CLAIM OF PRIORITY

This application claims priority under 35 U.S.C. §119(a) to Korean Patent Application Serial No. 10-2013-0105519, which was filed in the Korean Intellectual Property Office on Sep. 3, 2013, the entire disclosure of which is hereby incorporated by reference.

BACKGROUND

1. Technical Field

The present disclosure concerns a computer-readable recording medium for recording an object from a captured image and providing information associated with the recognized object.

2. Description of the Related Art

In image object recognition, a finger object is relatively easily recognized because of its substantially regular shape in comparison to other recognition targets. However, to identify a finger, initially feature point comparison is typically performed for various sizes and angles. As an example of finger recognition, after a finger shape is stored as a template, a finger shape may be recognized using the stored template. Further, to improve recognition rate, skin color may be used. In response to finger recognition, a recognized finger path is traced to recognize a moving path of a fingertip. A known Lucas-Kanade (LK) scheme for recognizing a position based on a size of a finger and a change in an angle may be used.

However, in finger-recognition-based input, operations are performed in involving different variables (for example, various sizes and angles) of a stored finger template. Use of these variables improves recognition rate but increases computation required. Since computation needs to be performed for the regions of a captured image, complex computation is required for a high-definition image.

SUMMARY

A system provides a method and computer-readable recording medium for recognizing an object, in which information recognized from an image captured by a first electronic device is transmitted to a second electronic device to provide information associated with the captured image.

A system recognizes an object employed by an electronic device, by capturing an image using a camera module and transmitting information recognized from the captured image to an external electronic device connected with the electronic device via a communication network. The system receives information associated with the recognized information from the external electronic device and displays the received information on a display.

In a feature, the recognizing of the information from the captured image comprises: detecting a finger image in a predetermined partial region of an entire region of the captured image; and detecting at least one object in a region of predetermined size that is located adjacent to a position at which the finger image is detected in the captured image. The predetermined partial region has a predetermined size or direction in the captured image and the detection of a finger image comprises determining transition in pixel luminance to determine a feature boundary, transforming the identified image feature using translation, scaling and rotation operations for comparison with a predetermined stored feature image of a particular user using mapping information associating a user anatomical feature with a user identifier. The object is one selected from among a barcode, a Quick Response (QR) code, a wine label, a material object, a human body, a face, and feature point information. The electronic device is a wearable device that is able to be worn on a human body and the detection of at least one object comprises determining transition in pixel luminance to determine an object boundary, transforming the identified image object using translation, scaling and rotation operations for comparison with a predetermined stored object image of a particular user using mapping information associating a user anatomical object with a user identifier. Also, electronic device is of a watch type or a glasses type.

In another feature, a method for recognizing an object by an electronic device, comprises receiving information at a second electronic device, the information being recognized from an image captured by a first electronic device; searching for information associated with the received recognized information; and displaying the searched information on a display.

In a further feature, a method for recognizing an object by an electronic device, comprises capturing an image using a camera module, detecting a finger image in predetermined partial region of the captured image and detecting at least one object in a region of predetermined size that is located adjacent to a position at which the finger image is detected in the captured image. A type of the detected object is identified and an operation associated with the identified type of the detected object is performed. The predetermined partial region is determined in response to relative position between the electronic device and a finger when the electronic device is worn and has a predetermined size or direction in the captured image. The object is one selected from, a barcode, a Quick Response (QR) code, a wine label, a material object, a human body, a face, and feature point information.

In another feature, the detecting of the object comprises detecting a second finger image in a region of predetermined size that is located adjacent to a position at which a first finger image is detected, wherein the method further comprises: tracking movement of the first finger image or the second finger image; and recognizing an object included in an image of a region positioned between the first finger image and the second finger image. The recognizing of the object is performed if movement of the first finger image or the second finger image does not occur for a predetermined time. Also, the detecting of the finger image comprises: identifying a finger shape by comparison with a predetermined object shape. The detecting of the finger image comprises: identifying a finger by identifying pixel luminance transition indicating a finger edge.

In yet another feature, a method for recognizing an object by an electronic device irradiates light from an Infrared (IR) light source to at least a partial region of a hand, captures an image using an IR camera, extracts a pattern from predetermined at least a partial region of an entire region of the captured image and authenticates a user using the extracted pattern. The method recognizes the detected finger image as a finger at a particular position, if a position at which the finger image is detected in the captured image is adjacent to a particular position of a plurality of predetermined positions.

In an additional feature, a method recognizes an object by an electronic device, by emitting, using a first electronic device, light from an Infrared (IR) light source to at least a partial region of a hand, acquiring, by a second electronic device, an IR image including the at least a partial region of the hand and detecting a position of the hand from the acquired IR image by detection of a boundary of the at least a partial region of the hand in response to pixel luminance transition.

In yet an additional feature, a method for recognizing an object by an electronic device, comprises: detecting image data representing at least one finger of a user hand from an image captured by a first electronic device; detecting an image of the hand from an image captured by a second electronic device; determining, using the second electronic device, a gesture in response to movement of the detected hand; and performing different operations corresponding to determined gestures based on results of detection of the finger image detected by the first electronic device.

In yet a further feature, a method recognizes an object by an electronic device, comprising: connecting a plurality of electronic devices via communication; capturing, by a first electronic device among the plurality of electronic devices, an image including a second electronic device; detecting a finger image in a predetermined at least a partial region of an of the captured image; selecting an electronic device that is located adjacent to a position at which the finger image is detected from among the plurality of electronic devices; and transmitting a control signal to the selected electronic device. A computer-readable recording medium having recorded thereon a program executing the methods.

Information regarding the method for recognizing an object by an electronic device may be stored in a computer-readable recording medium. The recording medium may include a recording medium which stores programs and data such that they can be read by a computer system. Examples of the recording medium may include, but are not limited to, at least one of a Read Only Memory (ROM), a Random Access Memory (RAM), a Compact Disk (CD), a Digital Video Disk (DVD)-ROM, a magnetic tape, a floppy disk, an optical data storage device, an embedded Multimedia Card (eMMC), and also carrier waves (for example, transmission over the Internet). The recording medium may be distributed over network-coupled computer systems so that a computer-readable code may be stored and executed in a decentralized fashion.

BRIEF DESCRIPTION OF THE DRAWINGS

The above features and advantages will be more apparent from the following detailed description taken in conjunction with the accompanying drawings, in which:

FIG. 8 shows an example in which a wearable device is worn according to invention principles;

FIG. 9 shows an example of image capture in a wearable device according to invention principles;

FIG. 10 shows an example of image capture in a wearable device according to invention principles;

FIG. 11 shows a region for finger identification in a captured image according to invention principles;

FIG. 12 shows finger identification using a predetermined region in a captured image according to invention principles;

FIG. 13 shows a result of finger identification in a captured image according to invention principles;

FIG. 14 shows a result of identification of a plurality of fingers in a captured image according to invention principles;

FIG. 15 shows an example of recognizing an object based on finger identification according to invention principles;

FIG. 32 illustrates irradiating Infrared (IR) rays to a wearable device according to invention principles;

FIG. 33 illustrates acquiring a vein image using IR rays in a wearable device according to invention principles;

FIG. 34, FIG. 35, FIG. 36, and FIG. 37 illustrate detecting a hand or a finger by using an IR light source in a wearable device according to invention principles;

Throughout the drawings, like reference numerals will be understood to refer to like parts, components, and structures.

DETAILED DESCRIPTION

A detailed description of known functions and configurations incorporated herein will be omitted when it may obscure the subject matter.

Although ordinal numbers such as "first," "second," and so forth will be used to describe various components, those components are not limited by the terms. The terms are used only for distinguishing one component from another component. For example, a first component may be referred to as a second component and likewise, a second component may also be referred to as a first component. The term "and/or" used herein includes combinations of one or more of the associated listed items.

The terminology used herein is for the purpose of describing an embodiment. As used herein, the singular forms include the plural forms as well, unless the context clearly indicates otherwise. It will be further understood that the terms "comprises" and/or "has" when used in this specification, specify the presence of a stated feature, number, step, operation, component, element, or a combination thereof but do not preclude the presence or addition of one or more other features, numbers, steps, operations, components, elements, or combinations thereof.

The terms used herein, including technical and scientific terms, have the same meanings as terms that are generally understood by those skilled in the art, unless otherwise indicated the terms are differently defined. It should be understood that terms defined in a generally-used dictionary have meanings coinciding with those of terms in the related technology unless otherwise indicated.

A system recognizes an object in which information recognized from an image captured by a first electronic device is transmitted to a second electronic device to provide information associated with the captured image. In addition, an electronic device system recognizes an object in which a finger image is detected in a predetermined at least partial region in an image captured by an electronic device to improve the efficiency of a recognition process. An 'electronic device' may be a device including at least one processor and may include a camera, a portable device, a mobile terminal, a communication terminal, a portable communication terminal, and a portable mobile terminal. For example, the electronic device may be a digital camera, a smartphone, a cellular phone, a game console, a television (TV), a display device, a vehicle head unit, a laptop computer, a tablet computer, a Personal Media Player (PMP), a Personal Digital Assistant (PDA), a navigation device, an Automatic Teller Machine (ATM) of a bank, or a Point of Service (PoS) device of a store. The electronic device may be a flexible device or a flexible display device and may be a wearable device (for example, a watch-type device, a glasses-type device, or a clothing-type device).

Figure 1:
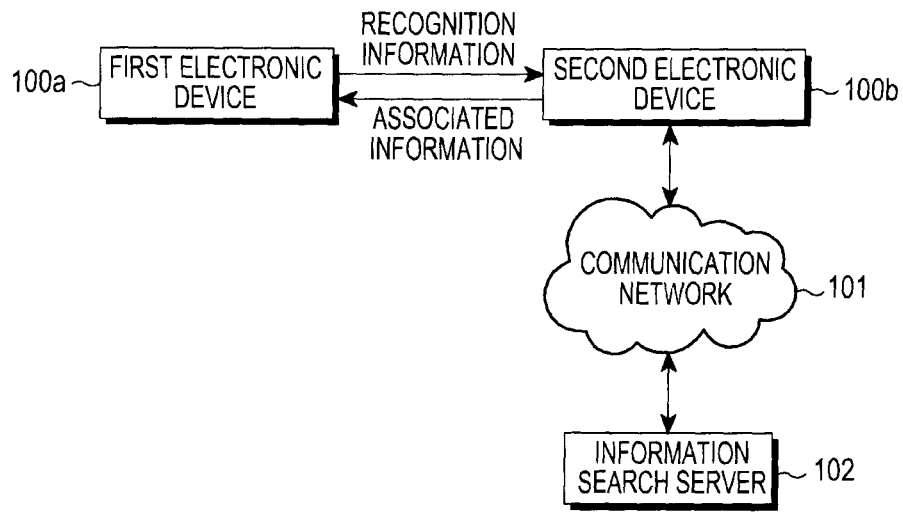
FIG. 1 shows a system according to invention principles.

FIG. 1 shows a system including first electronic device 100a and a second electronic device 100b and an information search server 102. If an image is captured using a camera module provided in the first electronic device 100a, information about the captured image (or captured image information) or recognition information recognized from the captured image may be transmitted to the second electronic device 100b. The first electronic device 100a and the second electronic device 100b may communicate with each other through a wired/wireless communication means. If the first electronic device 100a and the second electronic device 100b are located adjacent to each other, they may communicate with each other through a wired communication means or a short-range wireless communication means.

The recognition information recognized from the captured image may be information associated with a type of an object (for example, a barcode, a Quick Response (QR) code, a wine label, a material object, a human body, a face, for example) recognized from the captured image, may be information about at least a partial region including a region of the object recognized from the captured image, or may be information acquired by analyzing the object recognized from the captured image (for example, barcode identification information, QR code analysis information, feature point (descriptor) information, for example).

If the recognition information associated with the captured image is transmitted to the second electronic device 100b, the second electronic device 100b searches for information associated with the recognition information by using a database stored or an application installed in the second electronic device 100b. The information associated with the recognition information may be detailed information associated with the object recognized from the captured image. The identified information associated with the recognition information may be displayed on a display provided in the second electronic device 100b. The identified information associated with the recognition information may be transmitted to the first electronic device 100a. The first electronic device 100a may display the information associated with the recognition information, which is transmitted from the second electronic device 100b, on a display.

The second electronic device 100b may request the information search server 102 to search for the information associated with the recognition information via a communication network 101. In response to the search request from the second electronic device 100b, the information search server 102 searches for the information associated with the recognition information and provides the search result to the second electronic device 100b via the communication network 101. The information associated with the recognition information provided from the information search server 102 to the second electronic device 100b may be displayed on the display provided in the second electronic device 100b. The information associated with the recognition information provided from the information search server 102 to the second electronic device 100b may be transmitted back to the first electronic device 100a. The first electronic device 100a may display the information associated with the recognition information, which is transmitted from the second electronic device 100b, on the display.

The communication network 101 may be configured regardless of a type of communication such as wired communication or wireless communication, and may include various communication networks such as a Personal Area Network (PAN), a Local Area Network (LAN), a Metropolitan Area Network (MAN), or a Wide Area Network (WAN). The communication network 101 may be the known World Wide Web (WWW) and may use wireless transmission systems used for short-range communication such as Infrared Data Association (IrDA) or Bluetooth. The communication network 101 may include a cable broadcast communication network, a terrestrial broadcast communication network, or a satellite broadcast communication network to receive a broadcast signal.

Figure 2:
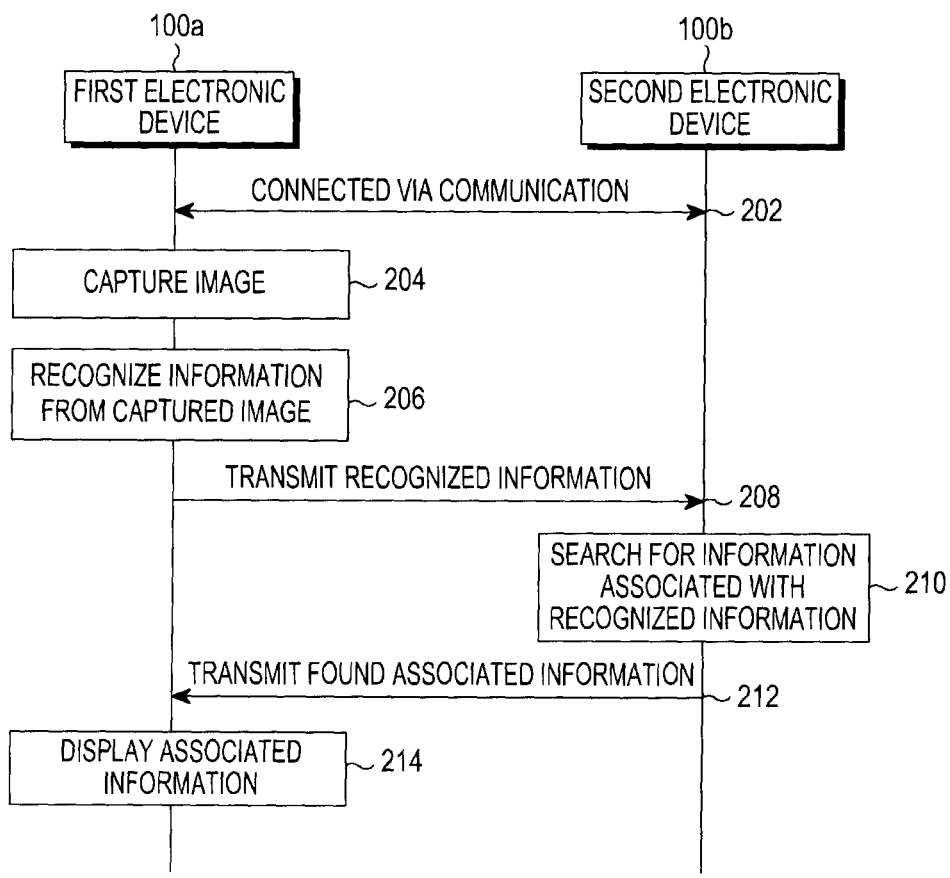
FIG. 2 shows a procedure for recognizing an object and providing associated information according to invention principles.

FIG. 2 shows signal flow in a procedure for recognizing an object and providing information associated with the object. The first electronic device 100a and the second electronic device 100b are connected through communication in step 202. The first electronic device 100a and the second electronic device 100b may be types that are similar to, the same as, or different from each other. For example, the first electronic device 100a may be a wearable device (for example, a watch-type device or a glasses-type device), and the second electronic device 100b may be a smartphone. The first electronic device 100a and the second electronic device 100b may be communicated through communication in various ways.

In response to an image being captured through the camera module provided in the first electronic device 100a in step 204, information is recognized from the captured image in step 206. The information recognized from the captured image is transmitted to the second electronic device 100b in step 208. The recognition information recognized from the captured image may be information associated with a type of the object recognized from the captured image (for example, a barcode, a QR code, a wine label, a matter object a human body, or a face), may be information about at least a partial region including a region of the object recognized from the captured image, or may be information acquired by analyzing the object recognized from the captured image (for example, barcode identification information or QR code analysis information or feature point information (descriptor)).

In response to the recognition information associated with the captured image is transmitted to the second electronic device 100b, information associated with the recognition information is searched for by using a database stored or an application installed in the second electronic device 100b in step 210. The information associated with the recognition information may be detailed information associated with the object recognized from the captured image. The identified information associated with the recognition information is transmitted from the second electronic device 100b to the first electronic device 100a in step 212. The first electronic device 100a displays the information associated with the recognition information, which is transmitted from the second electronic device 100b, on a display in step 214.

Figure 3:
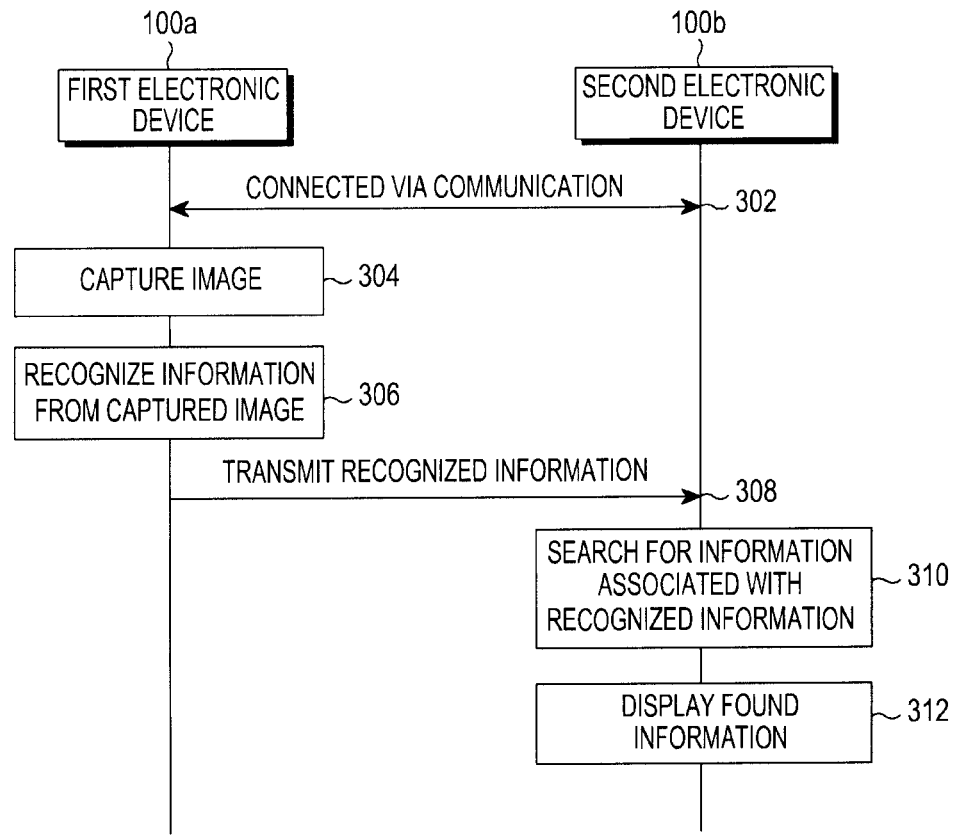
FIG. 3 shows another procedure for recognizing an object and providing associated information according to invention principles.

FIG. 3 shows a signal flow of a procedure for recognizing an object and providing information associated with the object. The first electronic device 100a and the second electronic device 100b are connected through communication in step 302. The first electronic device 100a and the second electronic device 100b may be types that are similar to, the same as, or different from each other. For example, as mentioned previously, the first electronic device 100a may be a wearable device (for example, a watch-type device or a glasses-type device), and the second electronic device 100b may be a smartphone. However, the present invention is not limited to these devices.

The first electronic device 100a and the second electronic device 100b may be connected through communication in various communication manners. If the first electronic device 100a and the second electronic device 100b are located adjacent to each other, they may be connected through communication by a wireless communication means or a short-range wireless communication means. If an image is captured through the camera module provided in the first electronic device 100a in step 304, information is recognized from the captured image in step 306. The information recognized from the captured image is transmitted to the second electronic device 100b in step 308. The recognition information recognized from the captured image may be information associated with a type of the object recognized from the captured image (for example, a barcode, a QR code, a wine label, a matter object a human body, or a face), may be information about at least a partial region including a region of the object recognized from the captured image, or may be information acquired by analyzing the object recognized from the captured image (for example, barcode identification information, QR code analysis information, or feature point (descriptor) information).

If the recognition information associated with the captured image is transmitted to the second electronic device 100b, information associated with the recognition information is searched for by using a database stored or an application installed in the second electronic device 100b in step 310. The information associated with the recognition information may be detailed information associated with the object recognized from the captured image. The found information associated with the recognition information is displayed on a display of the second electronic device 100b.

Figure 4:
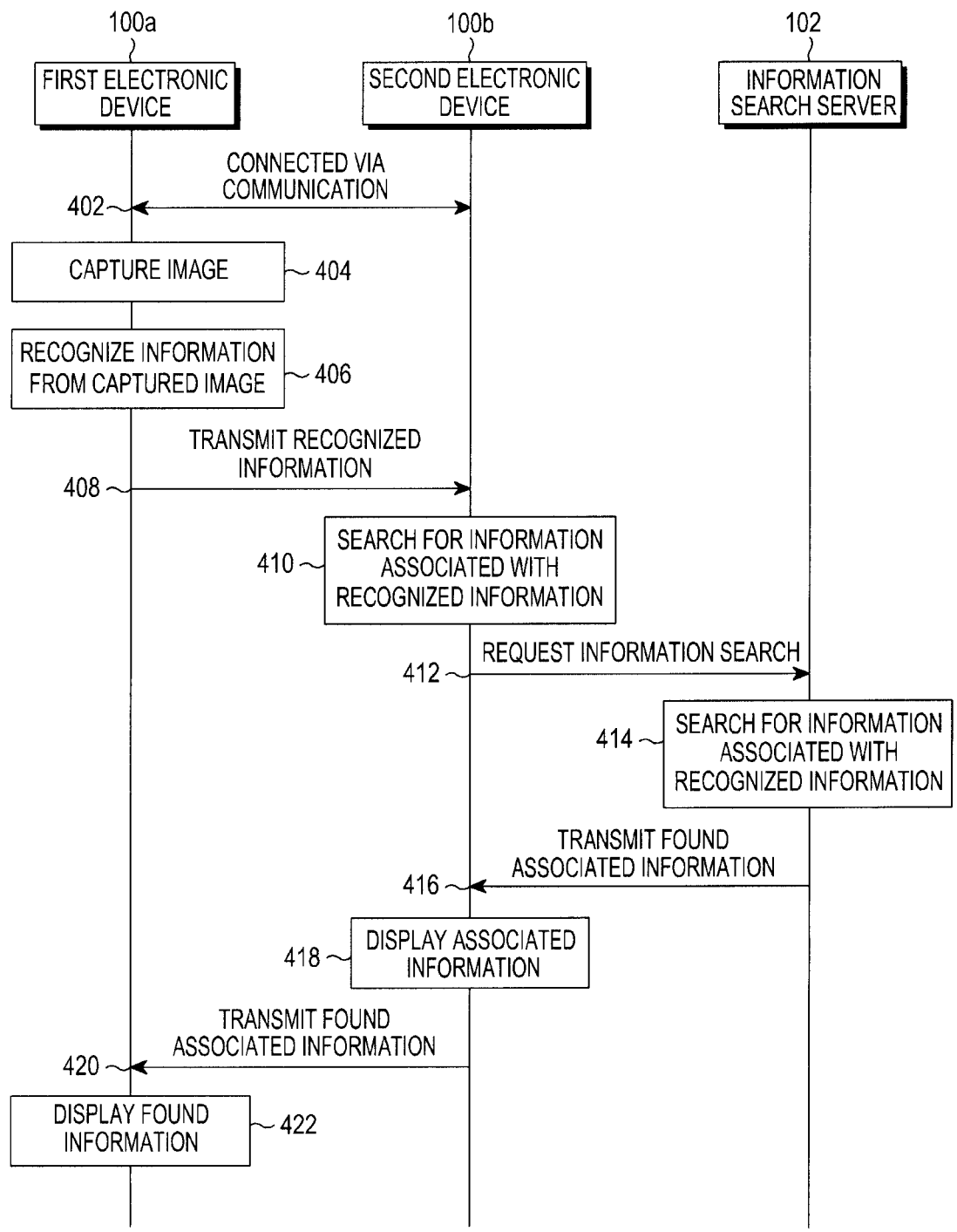
FIG. 4 a further procedure for recognizing an object and providing associated information according to invention principles.

FIG. 4 shows a signal flow of a procedure for recognizing an object and providing information associated with the object. The first electronic device 100a and the second electronic device 100b are connected through communication in step 402. The first electronic device 100a and the second electronic device 100b may be types that are similar to, the same as, or different from each other. For example, as described above, the first electronic device 100a may be a wearable device (for example, a watch-type device, a glasses-type device, or a clothing-type device), and the second electronic device 100b may be a smartphone. The first electronic device 100a and the second electronic device 100b may be connected through communication in various ways. If the first electronic device 100a and the second electronic device 100b are located adjacent to each other, they may be connected through communication by a wireless communication means or a short-range wireless communication means.

If an image is captured through the camera module provided in the first electronic device 100a in step 404, information is recognized from the captured image in step 406. The information recognized from the captured image is transmitted to the second electronic device 100b in step 408. The recognition information recognized from the captured image may be information associated with a type of the object recognized from the captured image (for example, a barcode, a QR code, a wine label, a matter object a human body, or a face), may be information about at least a partial region including a region of the object recognized from the captured image, or may be information acquired by analyzing the object recognized from the captured image (for example, barcode identification information, QR code analysis information, or feature point (descriptor) information).

If the recognition information associated with the captured image is transmitted to the second electronic device 100b, the second electronic device 100b searches for information associated with the recognition information by using a database stored or an application installed in the second electronic device 100b in step 410 or transmits the recognition information to the information search server 102 to request the information search server 102 to search for the associated information in step 412. In this case, the second electronic device 100b first searches for the information associated with the recognition information, and if there is no search result, the second electronic device 100b may request the information search server 102 to search for the associated information. The search result of the second electronic device 100b and the search result of the information search server 102 may be integrated to provide information. The information search server 102 searches for the information associated with the recognition information in response to the search request from the second electronic device 100b in step 414, and transmits the search result back to the second electronic device 100b via the communication network 101 in step 416.

The information associated with the recognition information provided from the information search server 102 to the second electronic device 100b is displayed on the display of the second electronic device 100b in step 418. The information associated with the recognition information provided from the information search server 102 to the second electronic device 100b is transmitted to the first electronic device 100a in step 420. The first electronic device 100a displays the information associated with the recognition information, which is transmitted from the second electronic device 100b, on the display in step 422.

Figure 5:
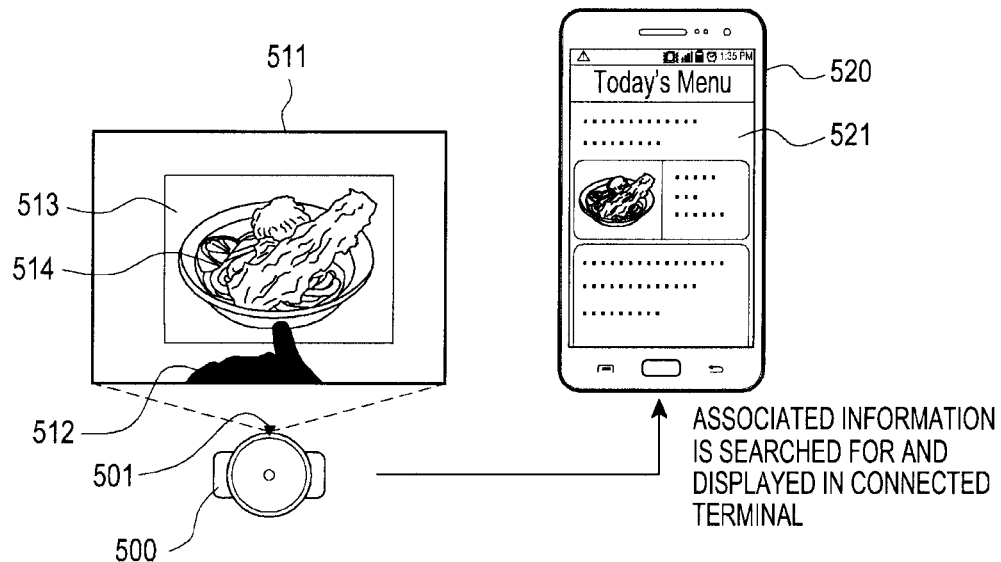
FIG. 5 illustrates providing information associated with a captured image by using a wearable device according to invention principles.

FIG. 5 illustrates providing information associated with an image captured using a wearable device according to an embodiment of the present invention. If a first electronic device 500 is a watch-type device, a user, while wearing the first electronic device 500 on a wrist, captures an image through a camera module 501 provided in the first electronic device 500. An image 511 captured by the first electronic device 500 may include at least a part of a hand 512 of the user. For example, since the first electronic device 500 is worn on the wrist, a part of the hand 512 (for example, a back of the hand 512) or a finger may be included in a predetermined position of the captured image 511 (for example, a lower portion of the captured image 511). Thus, if the user points the finger to a particular object 514 (for example, a dish that serves food in FIG. 5), the object 514 located adjacent to the finger is identified and a region 513 including the identified object 514 is analyzed. By analyzing the region 513 including the identified object 514, detailed information associated with the identified object 514 may be obtained. The object 514 may be identified in the entire image 511 captured by the camera module 501, the finger included in a predetermined region of the captured image 511 may be first detected and the object 514 located adjacent to the detected finger may be identified.

If it is possible for the first electronic device 500 to analyze a region 513 including the identified object 514, the first electronic device 500 performs analysis and displays the analysis result on the display of the first electronic device 500. Device 500 identifies features e.g. finger, hand by edge detection determining transition in pixel luminance along a feature boundary, for example, as known. Device 500 transforms the identified image features using translation, scaling and rotation operations for comparison with predetermined stored image features of particular users, for example, in mapping information. Device 500 compares the identified transformed features with predetermined stored mage features of a user of device 500 (or other device concerned) using the mapping information and identifies a feature in a captured image. The mapping information associates a predetermined stored object/feature image of a particular user with a user identifier. The first electronic device 500 may transmit the analysis result to the second electronic device 520 connected (for example, paired) through communication. The second electronic device 520 may receive the analysis result from the first electronic device 500 and display the analysis result on a display 521 (for example, a touch screen).

If it is not possible for the first electronic device 500 to analyze the region 513 including the identified object 514, the first electronic device 500 may transmit the captured image 511 or image information about the region 513 including the identified object 514 in the captured image 511 to the second electronic device 520. The second electronic device 520 may analyze the information transmitted from the first electronic device 500 and display the information associated with the identified object on the display 521. The second electronic device 520 may transmit information associated with the captured image (for example, the captured image 511 or the image information about the region 513 including the identified object 514) to the information search server 102 via the communication network 101 to request the information search server 102 to search for the associated information. The search result of the information search server 102 may be displayed on the display 521 of the second electronic device 520.

For example, if an object captured by the first electronic device 500 is an image associated with food or movie, additional information associated with food or movie may be searched for and displayed on the second electronic device 520. For example, if an object captured by the first electronic device 500 is text, a recognition result or a translation result of a sentence may be displayed on the second electronic device 520. For example, if an object captured by the first electronic device 500 is a person, the second electronic device 520 may be requested to transmit a file to the person through face recognition. The information transmitted from the first electronic device 500 to the second electronic device 520 may be the entire captured image or a part of the captured image.

Figure 6:
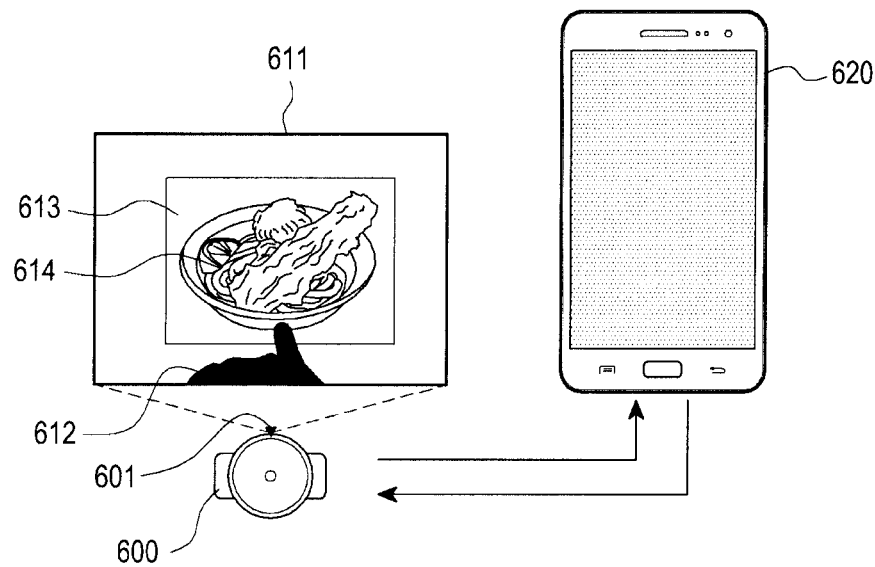
FIG. 6 illustrates providing information associated with a captured image by using a wearable device according to invention principles.

FIG. 6 illustrates providing information associated with a captured image by using a wearable device. If a first electronic device 600 is a watch-type device, the user, while wearing the first electronic device 600 on a wrist, may capture an image using a camera module 601 provided in the first electronic device 600. An image 611 captured by the first electronic device 600 may include at least a part of a hand 612 of the user. For example, since the user wears the first electronic device 600 on the wrist, a part of the hand 612 (for example, the back of the hand 612) and a finger may be included in a predetermined position of the captured image 611. Thus, if the user points the finger to a particular object 614 (for example, a dish serving food in FIG. 6), the object 614 located adjacent to the finger is identified and a region 613 including the identified object 614 is analyzed. As such, by analyzing the region 613 including the identified object 614, detailed information associated with the identified object 614 may be acquired.

If it is not possible for the first electronic device 600 to analyze the region 613 including the identified object 614, the first electronic device 600 transmits the image 611 captured by the first electronic device 600 or image information about the region 613 including the identified object 614 in the captured image 611, to the second electronic device 620. The second electronic device 620 analyzes the information transmitted from the first electronic device 600 and transmits information associated with the identified object 614 to the first electronic device 600. Also, device 620 transmits the information associated with the captured image 611 (for example, the captured image 611 or the image information about the region 613 including the identified object 614) to the information search server 102 via the communication network 101 to request the information search server 102 to search for associated information. The search result of the information search server 102 is transmitted to the first electronic device 600 for display on a display of the first electronic device 600.

For example, if an object captured by the first electronic device 600 is an image food or movie, additional information associated with food or movie may be searched for and displayed on the first electronic device 600. For example, if an object captured by the first electronic device 600 is text, a recognition result or a translation result of a sentence may be displayed on the first electronic device 600. For example, if an object captured by the first electronic device 600 is a person, the second electronic device 620 may be requested to transmit a file to the person through face recognition. The information transmitted from the first electronic device 600 to the second electronic device 620 may be the entire captured image or a part thereof. Recognizing an object by using finger identification in a predetermined region will be described with reference to FIGS. 7 to 21.

Figure 7:
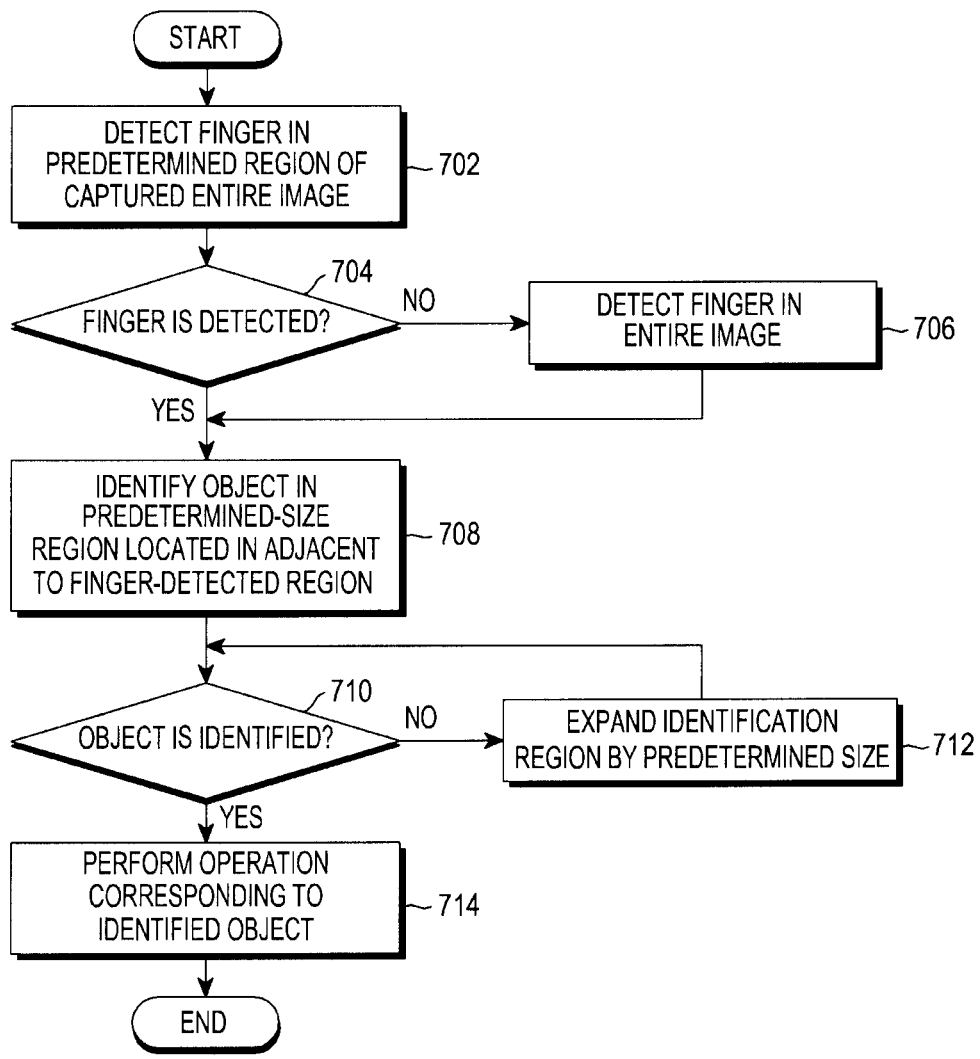
FIG. 7 is a flowchart of a method for recognizing an object by using finger identification according to invention principles.

FIG. 7 shows a flowchart of a procedure for recognizing an object by using finger identification. If an image is captured using a camera module provided in an electronic device (for example, a wearable electronic device including a watch-type device), a finger is detected in predetermined at least a partial region of the entire region of the captured image in step 702. For example, if an image is captured when a watch-type device is worn on the wrist as shown in FIGS. 11 to 14, a hand or a finger is positioned in a predetermined region of the captured image due to the wearing position of the watch-type device. For example, as shown in FIG. 12, a finger 1200 is positioned in a predetermined region 1110 of a captured image 1120.

Thus, the finger may be detected in the entire region of the captured image 1120, but the finger is preferentially detected in the predetermined at least a partial region, thereby efficiently performing finger identification with low computation and high speed. Thus, a finger may be detected in the entire region of the captured image 1120, by preferentially detecting a finger in the predetermined at least a partial region with less computation and at higher speed, leading to efficient finger detection. If any finger is not detected in the predetermined at least a partial region in step 704, the finger is detected in the entire region of the captured image in step 706. If the finger is detected in the entire region or the predetermined at least a partial region of the captured image, an object may be identified in a predetermined-size region located adjacent to the region or position where the finger is detected, in step 708. If the object is identified in the predetermined-size region in step 710, an operation corresponding to the identified object may be performed in step 714. On the other hand, if the object is not identified in the predetermined-size region in step 710, an object identification region is expanded by a predetermined size in step 712 and the object is identified in the expanded object identification region.

In response to the finger being detected, an object identification region is expanded from the neighborhood of the position at which the finger is detected, gradually from a narrow range to a broad range, and object identification is performed in the object identification region, thereby improving the efficiency of object identification.

FIG. 8 shows a wearable device where an image is captured and FIG. 10 shows image capture in a wearable device according to another embodiment. Referring to FIG. 8, a watch-type device 800 is worn on the wrist, and a camera 810 provided in the watch-type device 800 may be rotated to turn on the camera 810 or to switch a capturing mode of the camera 810 (for example, from a normal capturing mode to an object identification mode). More specifically, the camera 810 may be disposed in a circumference of a main body of the watch-type device 800 and the circumference may be rotatable with respect to the main body. For example, by including a means for detecting a degree of rotation or a position of the camera 810 mounted in the circumference, the capturing mode of the camera 810 may be switched to the object identification mode. For example, once the position of the camera 810 mounted on the watch-type device 800 is changed by rotation of the circumference as shown in FIG. 9, the changed position may be detected and the camera 810 may be actuated. If the position of the camera 810 is changed, a direction in which the camera 810 performs capturing is oriented toward a portion where a hand 820 (for example, the back of the hand 820) and a finger are situated. Thus, as shown in FIG. 10, the actuated camera 810 detects a finger 821 and if the finger 821 is detected, computation for object recognition may start.

In order to improve a recognition rate for a dark condition or a captured image, recognition may be performed using an auxiliary light source such as an Infrared Light Emitting Diode (IR LED) light source as shown in FIG. 10. Detection of a finger from at least a partial region of a captured image will be described with reference to FIGS. 11 to 15. FIG. 11 shows a region for finger identification in a captured image where a capturing direction of a camera is directed toward a fingertip of a hand of a user wearing a watch-type device. Size, direction, and position of a finger to be detected are determined by a relative position between the watch-type device and the hand, and the relative position between the watch-type device and the hand may be constant.

Referring to FIG. 11, considering a relative position between the watch-type device and a hand 1120 in an entire captured image 1100, a region 1110 in which the system may detect a finger may be preset. For example, the user, while wearing the watch-type device, may capture an image using a camera module, detect a hand or a finger in an entire captured image, and set and store a region in which the system is able to detect a finger by using a position or region of the detected hand or finger. A finger is preferentially detected in the stored region in which the system is able to detect the finger, thereby improving the efficiency of detection processing.

In FIG. 11, finger detection may be performed in the predetermined region 1110 in the entire captured image 1100. The predetermined region 1110 may be set to be inclined according to an angle of the hand. For example, by using a rectangular region inclined at a predetermined angle in an entire screen image as a predetermined region, finger detection may be performed. Thus, detection computation with respect to other angles may be skipped. Moreover, since the size of the finger is predetermined and the relative position between the watch-type device and the hand 1120 is almost fixed, detection may be performed with respect to a predetermined-size region. The size of the finger detected in the region is also constant, such that finger scaling may be skipped.

FIG. 12 shows finger identification using a predetermined region where a part of a hand 1120 may be included in a predetermined position of an entire image 1100 captured by a watch-type device. As shown in FIG. 13, a finger 1200 is detected in a predetermined region 1300 where a position of a finger detection region 1300 including the detected finger 1200 is identified. FIG. 13 shows a result of finger identification in a captured image. Hence, by using the finger detection region 1300, various functions (for example, operations associated with an object located adjacent to the finger detection region 1300) may be performed in various embodiments described below.

FIG. 14 shows a result of identification of a plurality of fingers in a captured image where at least one finger may be detected in a predetermined region of an entire captured image 1400. Different functions may be employed depending on the number of detected fingers or a position of a detected finger. If four fingers are detected, predetermined functions corresponding to respective detection regions 1421, 1422, 1423, and 1424 may be performed. For example, if text is recognized with one finger, recognition may be performed letter by letter (or in the unit of a letter); and if text is recognized with two fingers, recognition may be performed line by line; and if text is recognized with three fingers, recognition may be performed paragraph by paragraph. The unit of recognition may be changed with a moving direction of a finger. For example, if a finger is moved in the direction of a letter, recognition may be performed in the unit of a word; and if the finger is moved in perpendicular to the direction of a letter, recognition may be performed in the unit of a line; and if the finger is moved diagonally from the top to the bottom of a paragraph, recognition may be performed in the unit of a paragraph. If a user wears an accessory such as a ring 1430, different operations may be given depending on whether the accessory is worn or a shape or color of the worn accessory. Although not shown, different operations may be employed depending on whether a nail ornament (for example, a manicure) is recognized.

If predetermined unique conditions are satisfied using size, direction, and angle of a finger, it may be determined that the finger is a finger of a particular user. Thus, the user may be identified using finger identification. By detecting a focal length of a finger, it may be determined whether the finger is a finger of a user. That is, when a finger is detected in a corresponding position, if a contrast of a part of the finger is less than a preset value, by using edge information of an image of the finger, the finger may be recognized as another finger. In this case, the contrast of the finger may be obtained from a contour of the finger and wrinkles of the finger. Recognizing an object based on finger identification will be described with reference to FIGS. 15 to 21.

FIG. 15 is a diagram showing an example of recognizing an object based on finger identification. If a hand 1510 or a finger 1520 is detected in a captured image 1500, object recognition may be performed in a region located adjacent to a position in which the finger 1520 is detected (for example, a predetermined-size region). In FIG. 15, text, as an example of an object, is also recognized. Text recognition may be performed with respect to a predetermined-size region 1530 located adjacent to a position in which the finger 1520 is detected. Text recognition is excluded from being performed in the other region 1540. In this way, instead of performing text recognition with respect to the captured entire image 1500, text recognition may be performed with respect to a user-desired position (for example, a position pointed by a finger). Thus, unnecessary computation for text recognition may be prevented and text corresponding to a user-desired position may be selectively identified.

Start of text recognition may be determined by particular input, for example, voice input, touch input, or stop of a finger at a particular position for a predetermined time or more, with respect to a watch-type device. In response to start of text recognition, an image in the neighborhood of a finger may be sequentially analyzed to recognize text by text character shape matching with template text character shapes. Movement of a finger is associated with movement of a watch-type device, and thus the positions of the text and the image may be calculated from the amount of movement of the watch-type device, calculated by a position sensor embedded in the watch-type device. Based on the position information, a recognition region is determined from the captured image. The size of text may be larger than that of the predetermined-size region 1530 for text recognition and thus text recognition may not be performed normally. Therefore, if an object (for example, text in FIG. 15) is not recognized in the predetermined-size region 1530, the size of the region 1530 may be increased to an object-recognizable range in an incremental manner by predetermined size increments.

Figure 16:
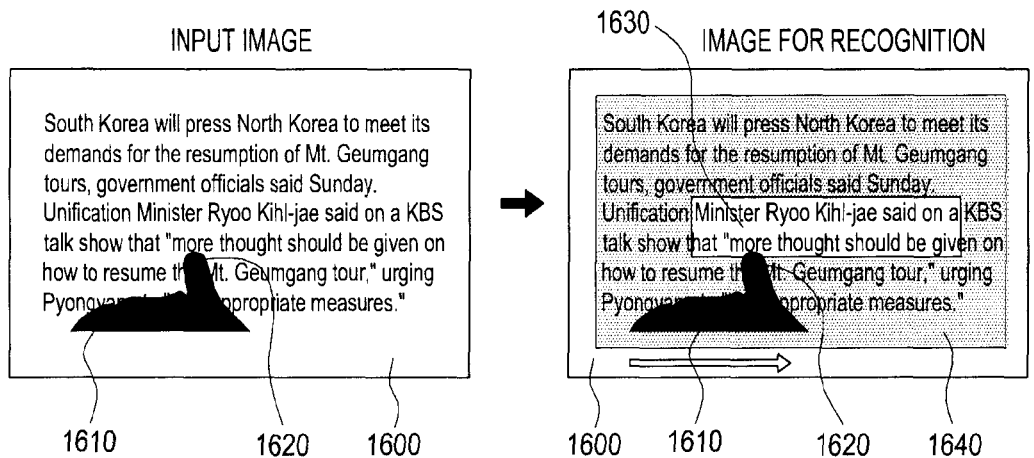
FIG. 16 shows an example of recognizing an object based on finger identification according to invention principles.

FIG. 16 shows recognizing an object based on finger identification. If a hand 1610 or a finger 1620 is detected from a captured image 1600, object recognition may be performed in a region located adjacent to a position in which the finger 1620 is detected (for example, a predetermined-size region). If the detected finger moves in a predetermined direction, the moving direction of the hand 1610 or the finger 1620 is determined by the position sensor embedded in the watch-type device and predicts a future moving direction from the previous moving direction of the hand 1610 or the finger 1620 to adjust the size of a recognition region 1630. The size of the recognition region 1630 for text recognition is increased providing more image data improving recognition performance. Text recognition is excluded from being performed in region 1640 external to predetermined-size recognition region 1630.

Figure 17:
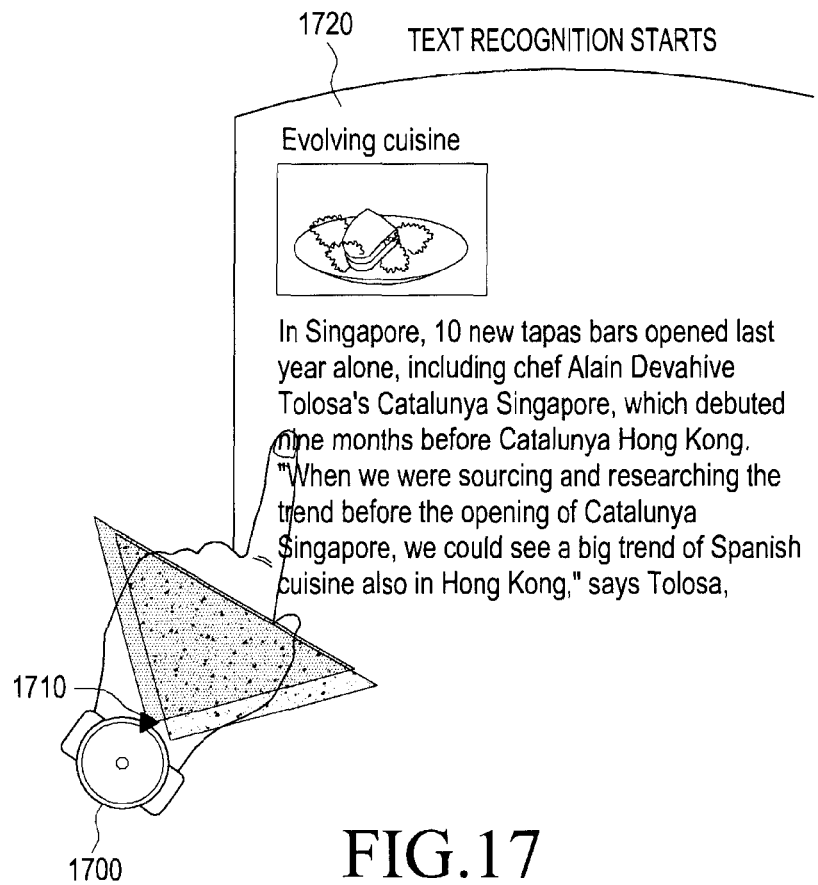
FIG. 17 and FIG. 18 illustrate recognizing and displaying a text using finger identification according to invention principles.
Figure 18:
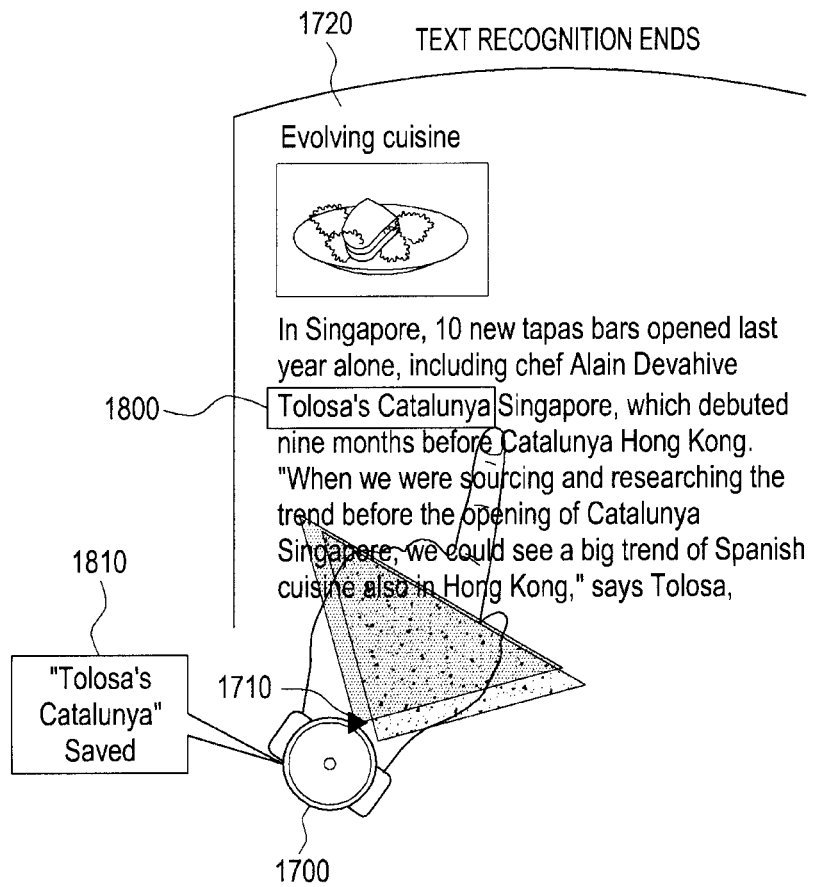

FIGS. 17 and 18 illustrate recognizing and displaying text based on finger identification. Referring to FIGS. 17 and 18, once a text recognition target 1720 is captured by a camera 1710 of a watch-type device 1700 worn on a wrist, a finger is detected from the captured image and an object included in a region located adjacent to the detected finger is identified. Text recognition may start as shown in FIG. 17, and may end as shown in FIG. 18. In response to completion of text recognition, recognized text 1800 may be displayed on a display of the watch-type device 1700 in step 1810. The recognized text 1800 may be output in the form of voice or may be displayed on another electronic device connected with the watch-type device 1700 via communication. An indication regarding text recognition may be provided to the user in the form of vibration.

Figure 19:
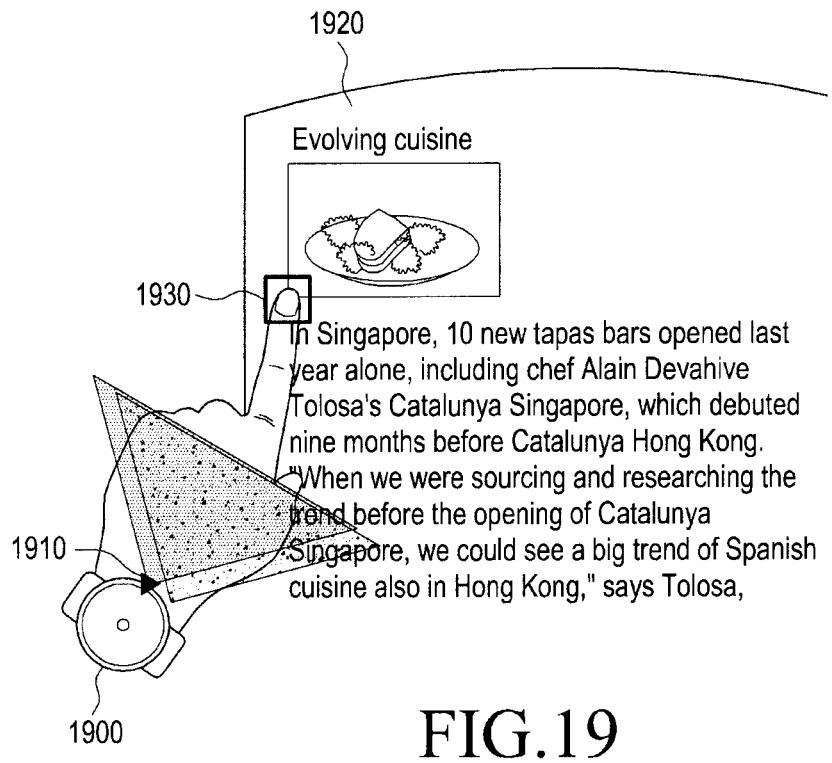
FIG. 19, FIG. 20, and FIG. 21 illustrate selecting a region based on identification of a plurality of fingers according to invention principles.
Figure 20:
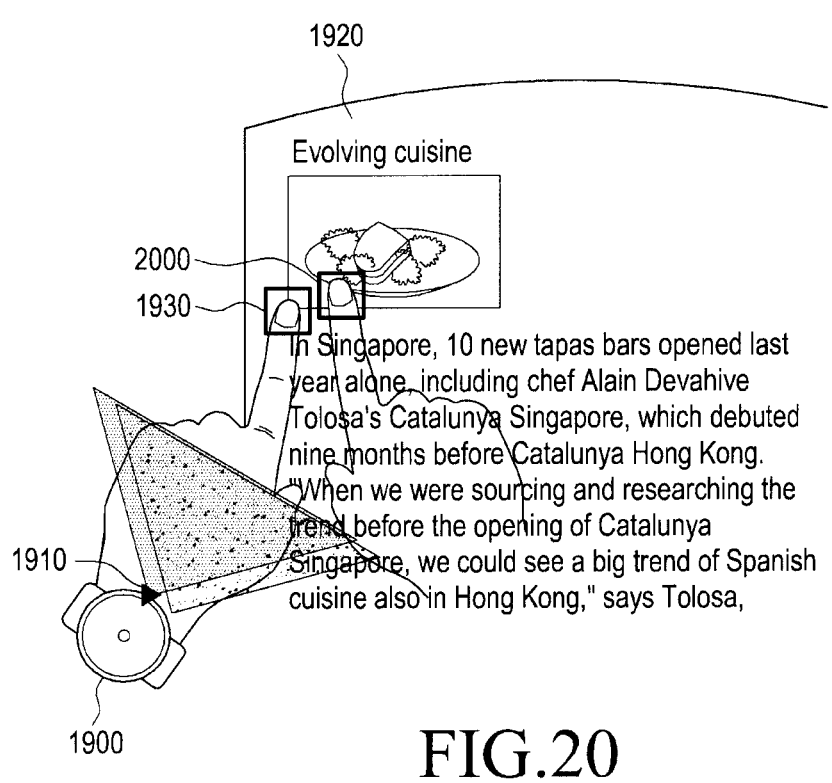
Figure 21:
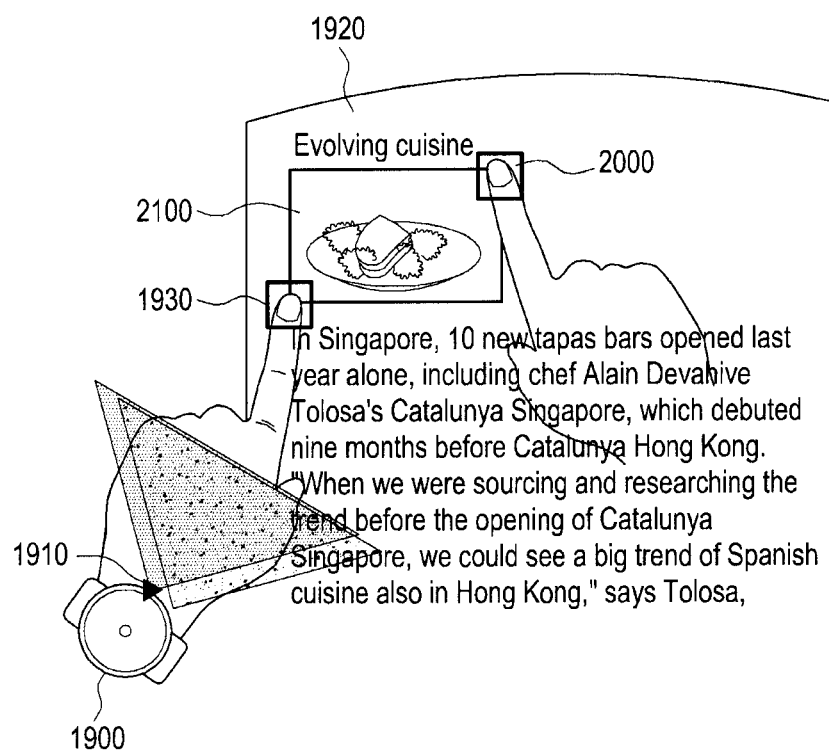

FIGS. 19 to 21 illustrate selecting a region based on identification of a plurality of fingers where region designation for photographing or recognition occurs involving a plurality of fingers. In FIG. 19, once a text recognition target 1920 is captured using a camera 1910 of a watch-type device 1900 worn on a wrist, a first finger 1930 is detected from the captured image and an object included in a region located adjacent to the detected first finger 1930 is identified. In FIG. 20, if a second finger 2000 which is different from the first finger 1930 is detected adjacent to the detected first finger 1930, movement of the first finger 1930 or the second finger 2000 is sensed. In FIG. 21, if movement of the first finger 1930 or the second finger 2000 is stopped for a predetermined time or more or another input is made by the user, a region 2100 between the first finger 1930 and the second finger 2000 may be captured or recognized.

Figure 22:
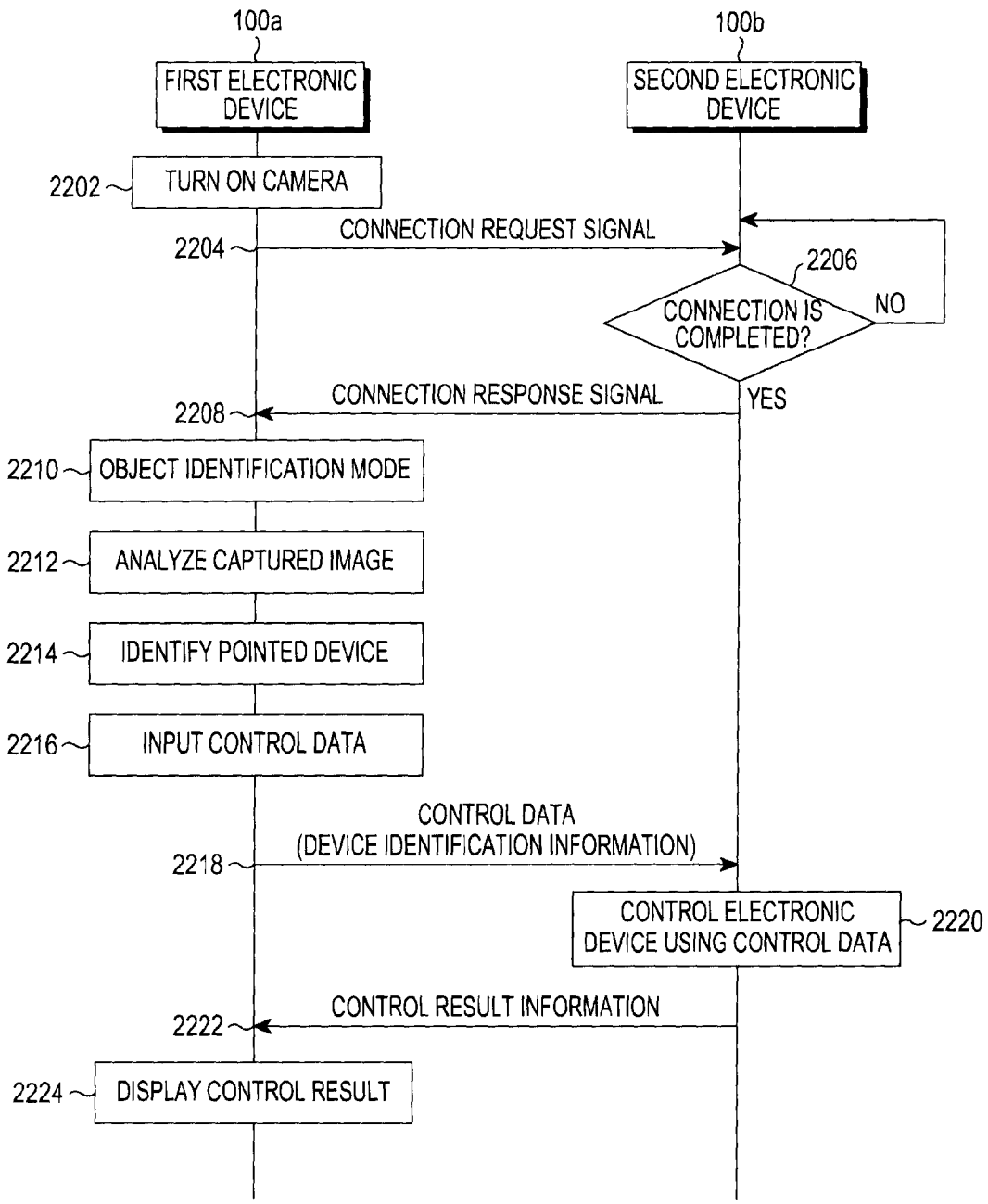
FIG. 22 shows a procedure for identifying a captured image and controlling a device according to invention principles.

FIG. 22 shows signal flow of a procedure for identifying a captured image and controlling a device where a camera mounted on a first electronic device 100*a* (for example, a wearable device) is turned on in step 2202 and a connection request signal is sent to a second electronic device 100*b* in step 2204. The second electronic device 100*b* completes connection in step 2206, and sends a connection response signal to the first electronic device 100*a* in step 2208. The first electronic device 100*a* is switched to an object identification mode in step 2210 and analyzes the image captured by the camera in step 2212. A finger is detected in a predetermined region of the captured image and a device in a region located adjacent to the detected finger is identified. The device pointed by the detected finger may be identified in step 2214. Upon input of control data in step 2216, the control data including device identification information regarding the device is transmitted to the connected second electronic device 100*b* in step 2218. The second electronic device 100*b* may control the device according to the control data received from the first electronic device 100*a* in step 2220. A user wearing a wearable device points a finger to a particular device so the pointed device may be controlled.

The second electronic device 100*b* may transmit control result information to the first electronic device 100*a* in step 2222, and the first electronic device 100a displays the transmitted control result information on the display in step 2224, allowing the user to see the control result.

The system may be applied to a method for manipulating a main device with an auxiliary device (such as a watch-type device). For example, the shape of the main device to be controlled is captured and stored in a database, and an image is analyzed in a live view captured by the watch-type device to identify a device designated by the finger from an entire image.

For instance, the database may be configured as provided below.

TABLE 1

| Image (Feature Point Information) | Device ID |
|---|---|
| TV | 1 |
| PC | 2 |
| Refrigerator | 3 |
| Washing Machine | 4 |

The image identified as described above is detected from the database and the device ID may be detected. Detection of the device ID may be performed in the watch-type device or another device connected with the watch-type device (for example, the second electronic device). Thus, the second electronic device sends a control signal to a device having the detected device ID, the watch-type device may control the device pointed by the finger.

Figure 23:
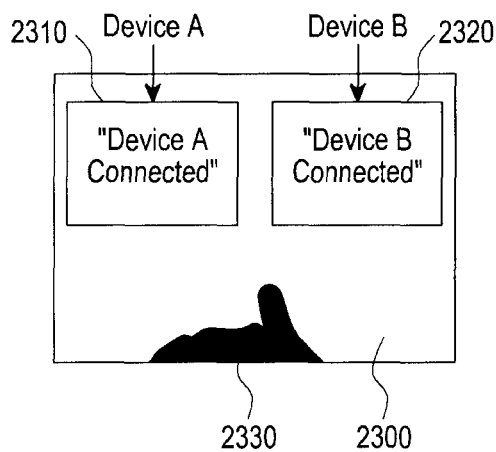
FIG. 23, FIG. 24, and FIG. 25 illustrate identifying a captured image and controlling a device according to invention principles.
Figure 24:
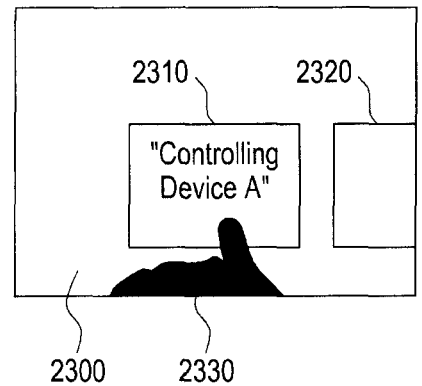
Figure 25:
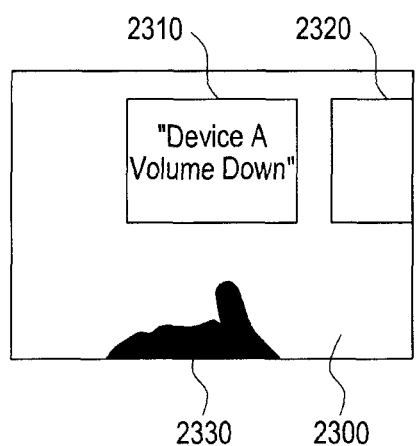

FIGS. 23 to 25 illustrate identifying a captured image and controlling a cooperated device. If a plurality of devices (for example, a device A and a device B) are simultaneously connected to a watch-type device, a device located adjacent to a finger in a captured image may be controlled. Thus, after the plurality of devices are connected to the watch-type device, one of them is pointed to by a finger to easily control the pointed device. For example, referring to FIG. 23, if a device A 2310 and a device B 2320 are connected to the watch-type device, an image 2300 captured by the watch-type device may include at least a part or a finger of a hand 2330. The captured image 2300 may show at least one of the connected devices. In FIG. 23, both the device A 2310 and the device B 2320 are shown in the captured image 2300.

If the user points the device A 2310 as shown in FIG. 24, the watch-type device identifies the finger and selects the device A 2310 that is located adjacent to the identified finger. A user presses a particular button of the watch-type device or makes a predetermined gesture to control the selected device (for example, the device A 2310). For example, as shown in FIG. 25, the user may turn down the volume of the selected device A 2310 by making a predetermined gesture. Control of a selected device may be performed according to the procedure described with reference to FIG. 22.

Figure 26:
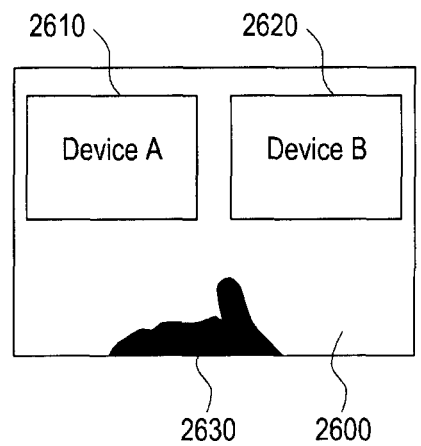
FIG. 26, FIG. 27, and FIG. 28 illustrate identifying a captured image and controlling a cooperated device according to invention principles.
Figure 27:
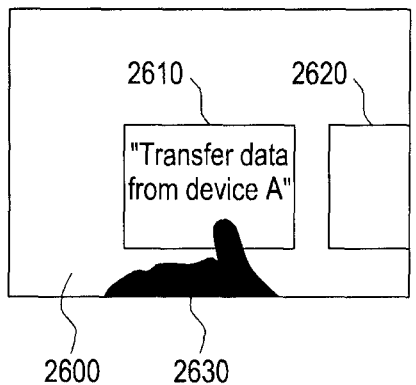
Figure 28:
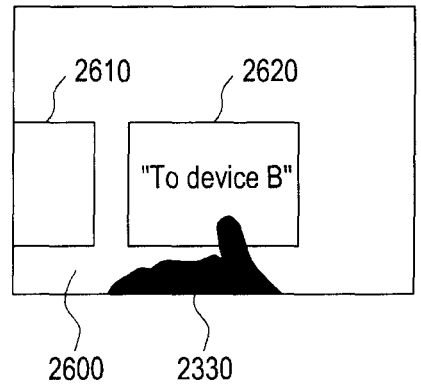

FIGS. 26 to 28 illustrate identifying a captured image and controlling a device where a plurality of devices connected to the watch-type device may be sequentially controlled. Referring to FIG. 26, if a device A 2610 and a device B 2620 are connected to the watch-type device, an image 2600 captured by the watch-type device may include at least a part or a finger of a hand 2630. The captured image 2600 may show at least one of the connected devices. Both the device A 2610 and the device B 2620 are shown in the captured image 2600. When the plurality of devices (for example, the device A 2610 and the device B 2620) are electrically connected with the watch-type device, the hand 2630 may be moved to point to the device A 2610 and input a command with a finger as shown in FIG. 27. The device A 2610, which is located adjacent to the detected finger, is recognized as a target for the input command and the selected device A 2610 may be controlled. Device B 2620 located adjacent to the detected finger is recognized as a target for the command and the selected device B 2620 is controlled. For example, if the device A 2610 is pointed to in order to initiate a data transfer command and device B 2620 is subsequently pointed to, data stored in the device A 2610 may be transferred to the device B 2620.

Figure 29:
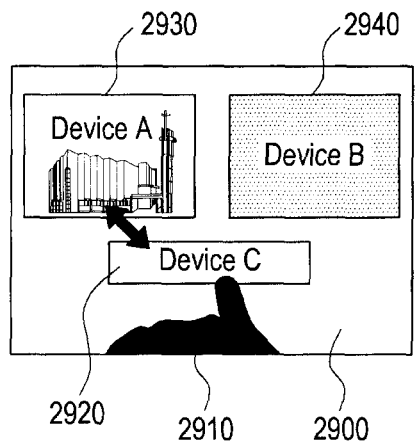
FIG. 29, FIG. 30, and FIG. 31 illustrate identifying a captured image and controlling a device according to invention principles.
Figure 30:
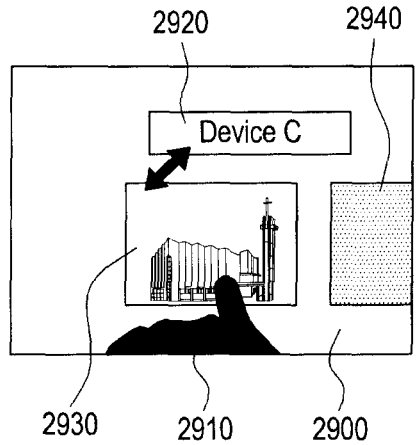
Figure 31:
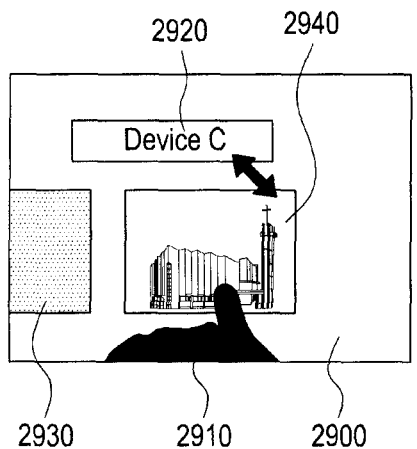

FIGS. 29 to 31 illustrate identifying a captured image and controlling a device where a plurality of connected devices may be sequentially controlled. When the plurality of devices (for example, a device A 2930 and a device B 2940) are connected to the watch-type device and a device C 2920 capable of controlling the plurality of devices is electrically connected to the watch-type device, the plurality of devices may be controlled by the device C 2920 using the watch-type device. For example, referring to FIG. 29, if the device A 2930 and the device 2940 are connected to the watch-type device, an image 2900 captured by the watch-type device may include at least a part or a finger of a hand 2910. The captured image 2900 may also show at least one of the connected devices. In FIG. 29, the device A 2930, the device B 2940, and the device C 2920 capable of controlling the device A 2930 and the device B 2940 are shown in the captured image 2900. Thus, as shown in FIG. 29, when the plurality of devices (for example, the device A 2930, the device B 2940, and the device C 2920) are electrically connected with the watch-type device, hand 2910 is moved to point the device A 2930 and input a command (for example, screen-off) with a finger as shown in FIG. 30. The watch-type device recognizes the device A 2930 as a control target device and sends an input command to the device C 2920. The device C 2920 recognizes the device A 2930 as a target of the input command and controls the selected device A 2930 according to the sent command. As shown in FIG. 31, the hand 2910 is moved to point the device B 2940 and to input a command with a finger. The device B 2940 located adjacent to the detected finger is recognized as a target of the command and the selected device B 2940 is controlled.

For example, if the device B 2940 is pointed to and a command (for example, screen-on) is input, the watch-type device recognizes the device B 2940 as a control target device and sends the input command to the device C 2920. The device C 2920 recognizes the device B 2940 as a target of the input command and controls the selected device 2940 according to the sent command. FIG. 32 shows emitting irradiating Infrared (IR) rays using a wearable device and acquiring a vein image using IR rays. Different systems may be employed for recognition of a user and a finger.

In personal authentication using biological information, vein authentication has been widely used together with fingerprint or iris authentication. Vein authentication uses properties of hemoglobin included in the blood, which absorb light at a particular wavelength. The most frequently used method of vein authentication uses vein patterns in the back of the hand or in the palm. To this end, after light from an IR light source (for example, light of 750 nm-950 nm) is irradiated to the back of the hand or the palm, the back of the hand or the palm is captured by a camera capable of capturing IR rays, thus acquiring a vein image, extracting a feature point from the acquired vein image, converting a position of the feature point into a code, and comparing the code with a previously stored user code for authentication.

Vein authentication using the wearable device (for example, the watch-type device) involves the wearable device acquiring an image having predetermined size and direction at a substantially fixed position in the human body. Therefore, by using a characteristic in which a vein pattern having predetermined position, size, and angle is input to an input device, vein pattern orientation and matching is facilitated.

For example, referring to FIG. 32, once IR rays are irradiated through an IR LED module 3210 when a watch-type device 3200 is worn, the irradiating direction of the IR rays is directed toward the back of the hand and thus a vein image of the back of the hand is acquired for authentication. Referring to FIG. 33, a vein image 3300 having the same position, direction, and size at the position in which the watch-type device is worn is captured, thus facilitating authentication based on the vein image without separate pattern orientation or matching. In response to successful vein authentication, a terminal ID is extracted from authentication information for connection with a terminal having the same ID as the extracted ID among neighboring terminals. Also lock of a watch-type device or a terminal communicating with the watch-type device may be released and if authentication fails, an alarm may be generated. A user pulse and blood pressure are measured from the captured vein image to provide a measurement result.

FIGS. 34 to 37 illustrate detecting a hand or a finger by using an IR light source in a wearable device improving hand recognition performance using a particular wavelength (for example, IR rays) applied to a hand from a wearable device (for example, a watch-type device). As shown in FIG. 34, a first device (for example, a watch-type device 3415) may irradiate light from an IR light source 3410 toward a hand 3420 and to enable determination of a direction of IR light source 3410, a plurality of arranged light sources may be used. In response to a second device (for example, a glasses-type device) capturing an IR image, a region of the hand 3420 irradiated by the first device may be displayed bright and region 3400 external and exclusive of region 3420 may be displayed dark.

As shown in FIG. 35, a luminance filter may be applied to detect a hand or a finger in a bright region 3520 exclusive of dark region 3500. Thus, by finger direction and size determination based on direction and position of the watch-type device, a hand or a finger having corresponding position, direction, and size may be detected. In addition, a distance to the hand or a direction of the hand may be determined from the size of a light source and the direction of arranged light sources by analyzing an image. A background image is captured in a normal image capturing mode as shown in FIG. 36, and an object located in the background of a finger is recognized as shown in FIG. 37, such that the position of the recognized finger and the position of the recognized object are compared to recognize the object pointed to by the user.

Figure 38:
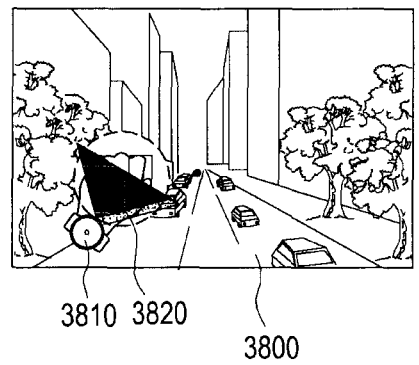
FIG. 38 shows detecting a hand in a first terminal according to invention principles.
Figure 39:
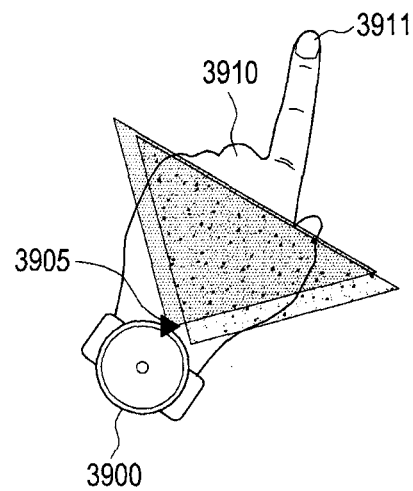
FIG. 39 shows detecting a finger in a second terminal according to invention principles.
Figure 40:
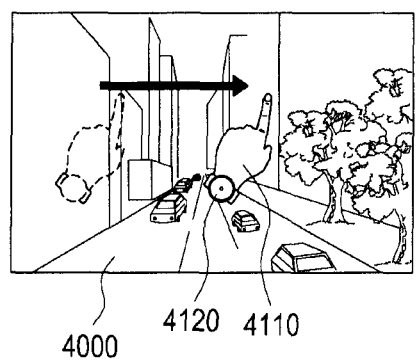
FIG. 40 shows recognizing a gesture in a first terminal according to invention principles.

A different method for performing finger recognition and hand recognition employs a procedure shown in FIGS. 38 to 40. For example, the shape of the finger viewed from a hand fixed position is constant, but the shape of the finger viewed from a terminal such as a TV or glasses may vary with angle and distance of the finger. Thus, for recognition at a position away from a camera, or for recognition using a low-pixel camera, due to absence of sufficient image information regarding a finger, it may be difficult to recognize the finger. However, the position of a hand may be detected based on knowledge of a human skeleton for example. Thus, when a gesture using the hand is recognized by another device instead of a watch terminal and a different gesture is given according to a finger, finger recognition may be performed by a separate device such as a watch-type device.

In this case, a result of recognition of a gesture made by movement of a hand may be functionally differently in response to a result of recognition of a finger. For example, if a gesture of moving the hand to the side while unfolding an index finger is made, movement of an image displayed on the screen may be initiated. If the same hand gesture is input while unfolding other fingers, a function for displaying a next image is initiated. Movement of the hand is detected by a gesture recognizing terminal like a glasses-type device and finger recognition is performed by a watch-type device, such that different operations may be performed according to detection results based on information of the two devices.

FIG. 38 illustrates detection of a hand included in a screen 3800 captured by a first device (for example, a glasses-type device). For example, as described above, a hand 3820 may be detected by the glasses-type device by using IR rays irradiated from a second device (for example, a watch-type device 3810). As shown in FIG. 39, a finger may be detected by the second device (for example, the watch-type device 3810) in the above-described manner. Referring to FIG. 40, a hand 4110 included in a screen 400 captured by the first device (for example, a glasses-type device) may be detected by a second device (for example, a watch-type device 4120), and movement of the detected hand may be recognized. A gesture of the first device may be recognized differently according to a finger detection result.

Figure 41:
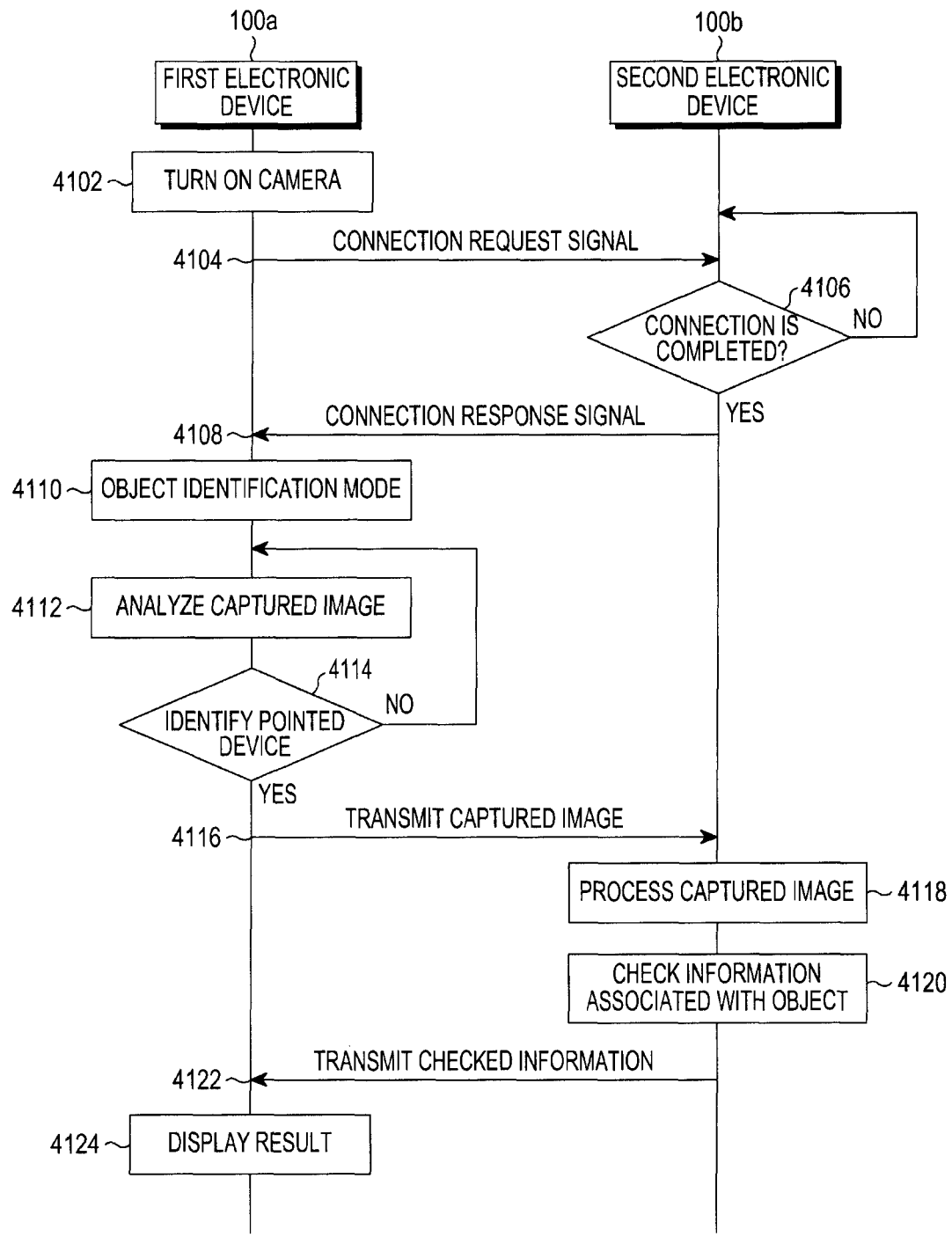
FIG. 41 shows a procedure for analyzing a captured image to identify an object and providing associated information according to invention principles.

FIG. 41 shows signal flow of a procedure for analyzing a captured image to identify an object and providing information associated with the recognized object. Referring to FIG. 41, a camera mounted on a first electronic device 100a (for example, a wearable device) is turned on in step 4102 and the first electronic device 100a sends a connection request signal to a second electronic device 100b in step 4104. The second electronic device 100b completes connection in step 4106 and sends a connection response signal to the first electronic device 100a in step 4108. The first electronic device 100a switches to an object identification mode in step 4110 and analyzes an image captured by a camera in step 4112. The first electronic device 100a detects a finger in a predetermined region of the captured image and identifies an object in a region located adjacent to the detected finger in step 4114. If an object is not identified, the first electronic device 100a moves or expands the predetermined region to analyze the captured image in step 4112. If object identification succeeds, the first electronic device 100a captures a region including the identified object and transmits the captured image of the region to the second electronic device 100b in step 4116. The second electronic device 100b performs image processing based on image data received from the first electronic device 100a in step 4118, and recognizes information associated with the object in step 4120.

The second electronic device 100b transmits the recognized information back to the first electronic device 100a in step 4122, and the first electronic device 100a displays the transmitted information associated with the object on the display in step 4124, allowing the user to see the information associated with the analyzed object. Whether image capturing succeeds or not may be displayed on the screen of the first electronic device 100a or the second electronic device 100b. If there are a plurality of recognition objects as a result of processing the captured image, the second electronic device 100b may process an object located adjacent to a finger. An identifiable object may include a barcode, a QR code, and a wine label. Examples similar to the QR code may include a color zip code, a smart tag, and a data matrix. The barcode and the QR code may be classified into a one-dimensional (1D) code and a two-dimensional (2D) code. For simple information delivery, the barcode is used, and information may be stored according to coding principles described below.

The barcode is classified according to a coding method. The coding method represents one-digit number or one character of the original indicated by the barcode as a combination of black and white bars and provides start and end of the barcode and also a checksum. The coding method may be classified based on the following two criteria:

Continuous barcode vs. Discrete barcode: Codes indicating numbers or characters in a continuous barcode are continuous and to distinguish the numbers or characters, the start and end of the numbers or characters are different from each other (for example, one character ends with black and the next character begins with white, or vice versa). On the other hand, codes indicating numbers or characters in a discrete barcode are spaced apart from each other and mostly begin and end with black. In the discrete barcode, a space between one-digit numbers or characters is not limited (as long as the spaced numbers or characters may be recognized as one code).

Two-width barcode vs. Many-width barcode: In the two-width barcode, the width of a black bar and the width of a white bar are classified into two: wide and narrow. That is, the exact difference between the wide bar and the narrow bar has no significance. However, in the many-width barcode, the width of every bar is a multiple of the narrow bar. In the many-width barcode, the width of the narrow bar is called a module. For example, a four-width barcode includes 1, 2, 3, and 4 module bars.

A QR code has an information recording density that is 20-40 times higher than the barcode, and also has a data restoring function, and thus the QR code may also be used when high-performance recognition is required. The general barcode may store number or character information in a single direction, that is, one-dimensionally, whereas the QR code may have more information because of having a 2D form horizontally and vertically and may also store character data such as alphabets or Chinese characters as well as numbers. A color whose shade is distinguishable may be given to the QR code. The QR code supports various versions, for example, version 1 through version 40, each of which has different information and size that may be provided to the maximum extent. To facilitate expression and reading of data, the QR code is divided into regions, such as a quiet zone, a position detection pattern (including a separator), a timing pattern, an alignment pattern, format information, version information, and a data region (including an Error Correction Code (ECC) region). The QR code may include, for example, a maximum of 7089 digits, a maximum of 4296 zeros (a separate code table is provided), a maximum of 2953 8-bit bytes, and 1817 Chinese characters.

Wine label recognition comprises recognizing a label of wine attached onto the outer surface of a wine bottle. A wine label is captured by a camera for comparison with a label stored in a database of a server to read information stored in the same label. For efficient search, an image recognition algorithm may be used and instead of comparing the entire image of the wine label with a stored label, a feature point detected in the label may be compared and to improve a recognition rate, image processing for compensating for warping occurring due to the round shape of the wind bottle may be further performed. In ideal conditions, recognition may be possible with the camera in a general visible light environment, but in case of low-illumination conditions or severe-reflection conditions, light from an IR light source may be irradiated to a recognition target and a reflected pattern may be recognized. In case of a wine label, an image may be used, such that a server including a database of the image is accessed to download a result. If an object identification mode 4110 of FIG. 41 is in an Optical Character Recognition (OCR) mode, text may be extracted from the captured image.

Figure 42:
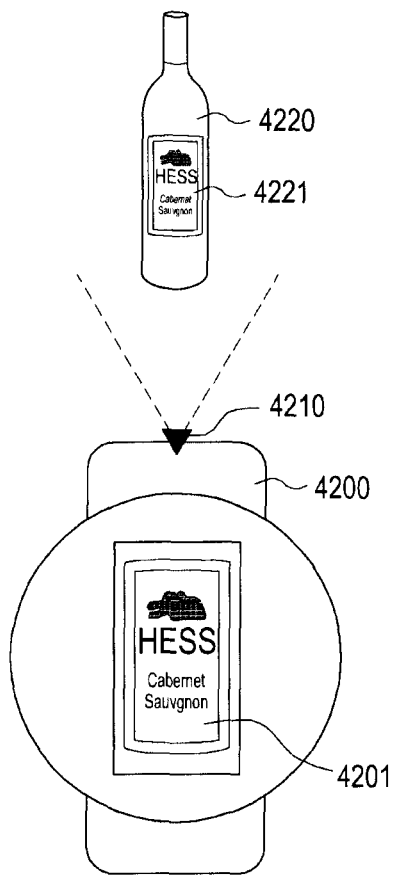
FIG. 42 illustrates analyzing a captured image to identify a wine label according to invention principles.
Figure 43:
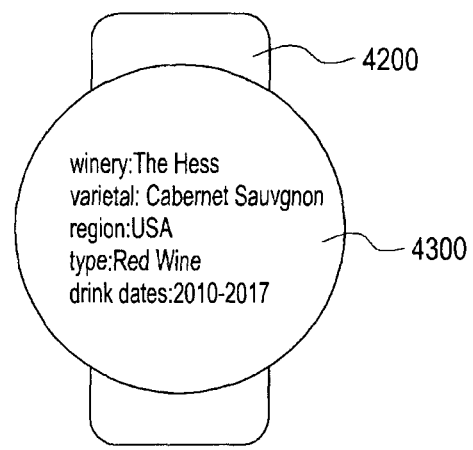
FIG. 43 illustrates displaying associated information of an identified wine label according to invention principles.

FIG. 42 shows analyzing an image and identifying a wine label 4221 attached to a wine bottle 4220 captured using a camera 4210 of a watch-type device 4200. A captured image of the wine label 4221 is displayed on a display 4201. As shown in FIG. 43, the captured wine label image is analyzed and the analysis result is displayed on a display 4300 of the watch-type device 4200. FIG. 43 shows displaying associated information of an identified wine label. The captured wine label image may be analyzed in the watch-type device 4200, by another electronic device connected with the watch-type device 4200, or by a server connected via a network. An object that may be recognized using the methods shown in FIGS. 42 and 43 may be another object such as a name card, a QR code, a barcode as well as the wine label.

Figure 44:
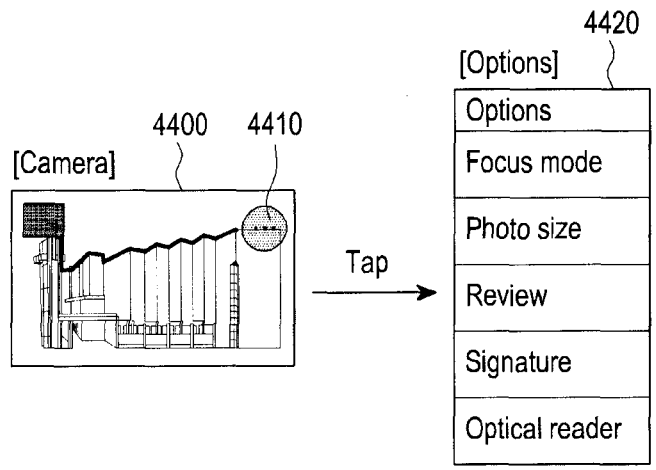
FIG. 44 and FIG. 45 illustrate displaying a menu for object identification in a captured image according to invention principles.
Figure 45:
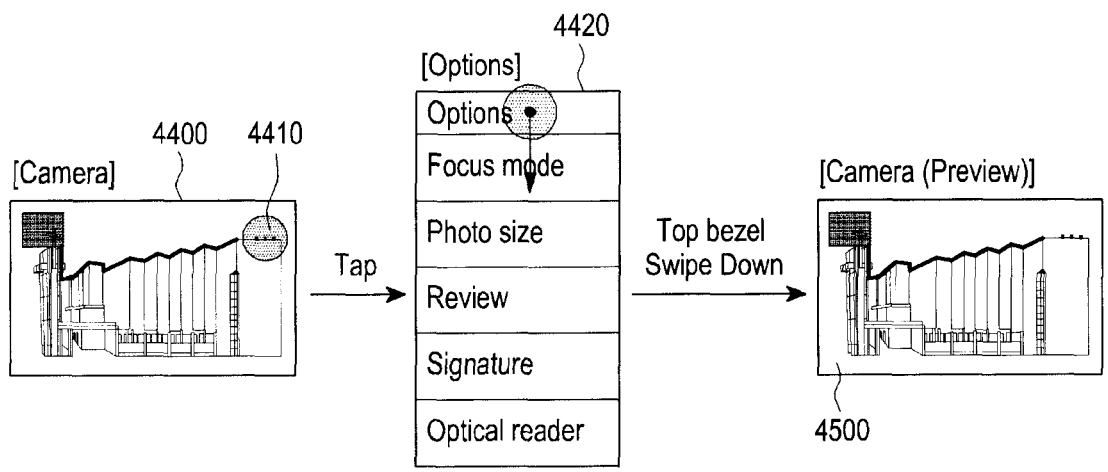

FIGS. 44 and 45 illustrate displaying a menu for object identification in a captured image. Referring to FIG. 44, a menu entry image 4410 for entering a particular menu may be displayed in an image 4400 captured by a watch-type device. Upon selection of the menu entry image 4410, a function selection menu 4420 may be displayed as shown in FIG. 44. In addition, upon selection of a particular function in the function selection menu 4420 of FIG. 44, a screen 4500 (FIG. 45) to which the selected function is applied may be displayed.

Figure 46:
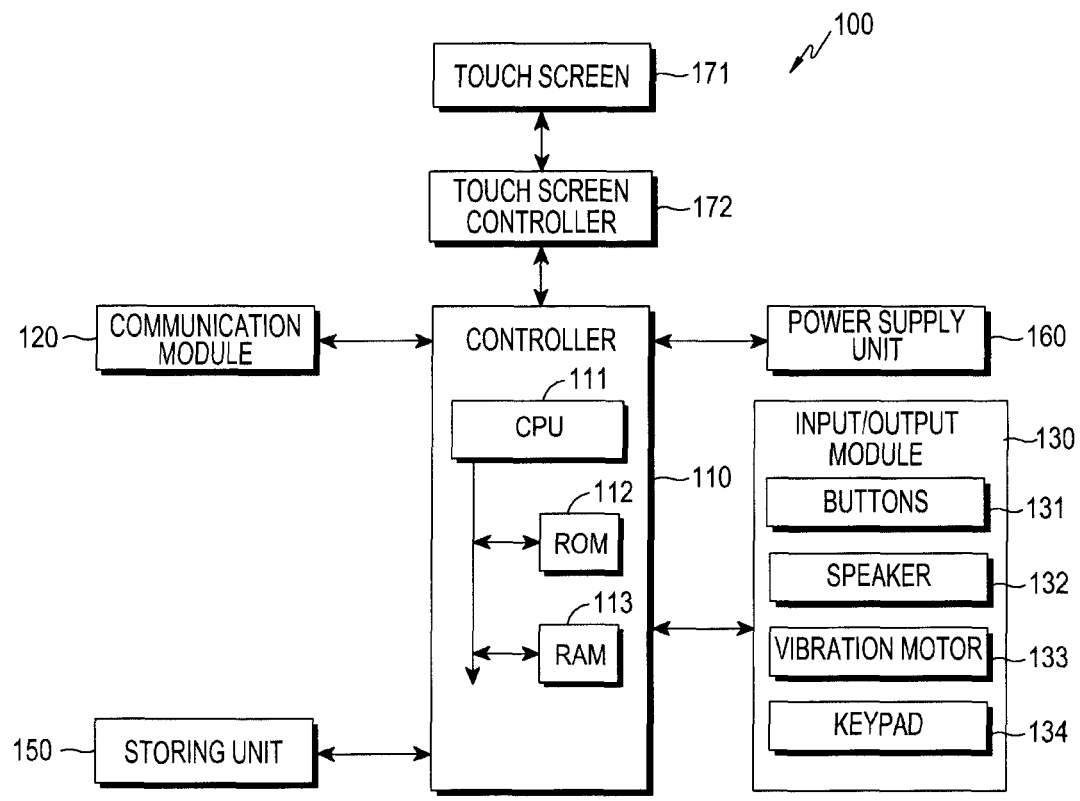
FIG. 46 shows a detailed structure of an electronic device according to invention principles.

FIG. 46 shows an electronic device 100 may be an example of the first electronic device 100*a* or the second electronic device 100*b*. As an example of the electronic device 100, the first electronic device 100*a* may be a watch-type device and the second electronic device 100*b* may be a portable device (for example, a cellular phone or a smartphone). Some of components of the electronic device 100 described below may be omitted or changed if necessary.

Referring to FIG. 46, the electronic device 100 may include a controller 110, a communication module 120, an input/output module 130, a storing unit 150, a power supply unit 160, a touch screen 171, and a touch screen controller 172. The controller 110 may include a Central Processing Unit (CPU) 111, a Read Only Memory (ROM) 112 in which a control program for controlling the electronic device 100 is stored, and a Random Access Memory (RAM) 113 which memorizes a signal or data input from the outside of the electronic device 100 or is used as a memory region for a task performed in the electronic device 100. The CPU 111, the ROM 112, and the RAM 113 may be interconnected through an internal bus. The controller 110 may control the communication module 120, the input/output module 130, the storing unit 150, the power supply unit 160, the touch screen 171, and the touch screen controller 172. The controller 110 may include a single core processor or a multi-core processor such as a dual core, a triple core, or a quad core processor.

The communication module 120 includes at least one of a cellular module, a Wireless Local Area Network (WLAN) module, and a short-range communication module. The cellular module enables the electronic device 100 to be connected with an external device via at least one—one or a plurality of—antennas through mobile communication under control of the controller 110. The cellular module transmits/receives a wireless signal for a voice call, a video call, a text message (Short Messaging Service: SMS), and/or a multimedia message (Multi Media Service: MMS) with a cellular phone (not illustrated), a smart phone (not illustrated), a tablet PC, or another electronic device (not illustrated) which has a phone number input into the electronic device 100.

The WLAN module may be connected to the Internet in a place where a wireless AP (not illustrated) is installed, under control of the controller 110. The WLAN module supports the WLAN standard IEEE802.11x of the Institute of Electrical and Electronics Engineers (IEEE). The WLAN module may drive a Wi-Fi Positioning System (WPS) for checking position information of a terminal including the WLAN module by using position information provided by a wireless AP connected wirelessly. The short-range communication module may wirelessly perform short-range communication with the electronic device 100 under control of the controller 110, and may process communication based on short-range communication such as Bluetooth, infrared data association (IrDA), WiFi-Direct communication, NFC communication, for example. The communication module 120 may also perform data communication with another electronic device connected by a Universal Serial Bus (USB) communication cable or a serial communication cable based on predetermined communication (for example, USB communication or serial communication).

The input/output module 130 may include at least one of buttons 131, a speaker 132, a vibration motor 133 and key pad 134. The buttons 131 may be formed on a front surface, a side surface, or a rear surface of a housing of the electronic device 100, and may include at least one of a power/lock button (not shown), a volume button (not shown), a menu button, a home button, a back button, and a search button. The speaker 132 outputs sound corresponding to various signals (for example, a wireless signal or a broadcast signal) of the cellular module, the WLAN module, and the short-range communication module to the outside of the electronic device 100. One or more speakers 132 may be formed in a proper position or proper positions of a housing of the electronic device 100.

The vibration motor 133 converts an electrical signal into mechanical vibration under control of the controller 110. A single vibration motor or multiple vibration motors may be formed in the housing of the electronic device 100. The speaker 132 and the vibration motor 133 may operate according to a setting state of a volume operation mode of the electronic device 100. For example, the volume operation mode of the electronic device 100 may include a ringer mode, a vibration mode, a ringer and vibration mode, and a silent mode and may be set to one of those modes. The controller 110 outputs a signal for instructing an operation of the speaker 132 or the vibration motor 133 according to a function to be performed by the electronic device 100 based on the set volume operation mode.

The storing unit 150 stores input/output signals or data corresponding to operations of the input/output module 130 and the touch screen 171 under control of the controller 110. The storing unit 150 also stores control programs and applications for controlling the electronic device 100 or the controller 110. The term 'storing unit' may include the storing unit 150, the ROM 112 and the RAM 113 in the controller 110, or a memory card (not illustrated) mounted in the electronic device 100 (for example, a Secure Digital (SD) card, a memory stick). The storing unit 150 may include a non-volatile memory, a volatile memory, a Hard Disk Drive (HDD), or a Solid State Drive (SSD). The power supply unit 160 supplies power to one or plural batteries (not illustrated) disposed in the housing of the electronic device 100 under control of the controller 110. The one or plural batteries (not illustrated) supply power to the electronic device 100. The power supply unit 160 may supply power input from an external power source (not illustrated) through a wired cable connected with a connector, which is included in the electronic device 100, to the electronic device 100.

The touch screen 171 displays a user interface corresponding to various services (for example, call, data transmission, broadcasting, picture/moving image capturing) to the user based on an Operating System (OS) of the electronic device. The touch screen 171 transfers an analog signal corresponding to at least one touch input to the user interface to the touch screen controller 172. The touch screen 171 receives at least one touch through a user's body (for example, a finger including a thumb) or a touch-possible input means (for example, a stylus pen). The touch screen 171 receives continuous movement touch data. The touch screen 171 transfers an analog signal corresponding to continuous movement of the received touch to the touch screen controller 172. The touch screen 171 may be of, for example, a resistive type, a capacitive type, an infrared type, or an acoustic wave type. The touch screen controller 172 controls an output value of the touch screen 171 to allow display data provided from the controller 110 to be displayed on the touch screen 171. The touch screen controller 172 converts an analog signal received from the touch screen 171 into a digital signal (for example, X and Y coordinates) and transfers the digital signal to the controller 110.

The controller 110 described above processes a user input by using data provided from the touch screen 171 and the touch screen controller 172. That is, the controller 110 controls the touch screen 171 by using the digital signal received from the touch screen controller 172. For example, the controller 110 may control a shortcut icon (not illustrated) displayed on the touch screen 171 to be selected or a shortcut icon (not illustrated) to be executed in response to a touch event or a hovering event. The electronic device 100 may include a sensor module or a camera module, and by using data input through the sensor module or the camera module, the user input may be processed.

For instance, the sensor module may include one or more sensors for detecting a state of the electronic device 100. For example, the sensor module 170 may include at least one of a proximity sensor for detecting user's proximity to the electronic device 100, an illumination sensor (not illustrated) for detecting an amount of light around the electronic device 100, and an RGB sensor. The sensor module may also include a motion sensor (not illustrated) for detecting a motion of the electronic device 100 (for example, rotation of the electronic device 100 or acceleration or vibration applied to the electronic device 100). Information detected by the sensor module may be provided to the controller 110 which may process the user input using the detected information.

The camera module may include a camera provided in the front or rear surface of the electronic device 10 to capture a still or moving image under control of the controller 110. The still or moving image captured by the camera may be provided to the controller 110. The controller 110 may process the user input by using the still or moving image provided from the camera.

Figure 47:
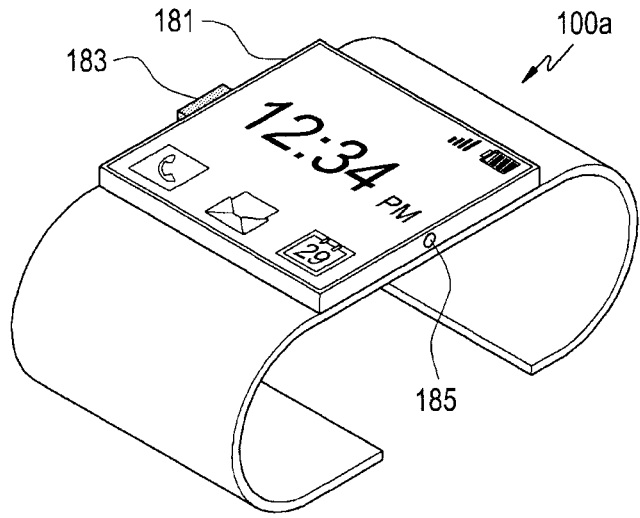
FIG. 47 is a perspective view showing an example of a wearable device according to invention principles.

FIG. 47 is a perspective view showing an example of a wrist wearable device like a watch. The watch-type device may include a central processing device for performing operations, a display for displaying information, and a communication device associated with peripheral electronic devices. A camera for image capturing may also be provided in the watch-type device for use as an image capturing or recognition camera. If the first electronic device 100*a* is a watch-type device, the first electronic device 100*a* may include a storing unit, a controller, and an input/output unit which have smaller capacity and smaller processing capability than the second electronic device 100*b*. For example, the watch-type device may be a terminal provided to a size that allows the user to wear on the body. The watch-type device may be coupled to a predetermined hardware component (for example, a watch chain) and worn on the user's wrist.

The watch-type device may also include a touch screen 181 of a predetermined size as an input/output unit, and may further include one hardware button 183. The watch-type device may display a screen image captured by a camera 185 on the touch screen 181 or display a result of analyzing an object recognized in the captured screen image on the touch screen 181.

Figure 48:
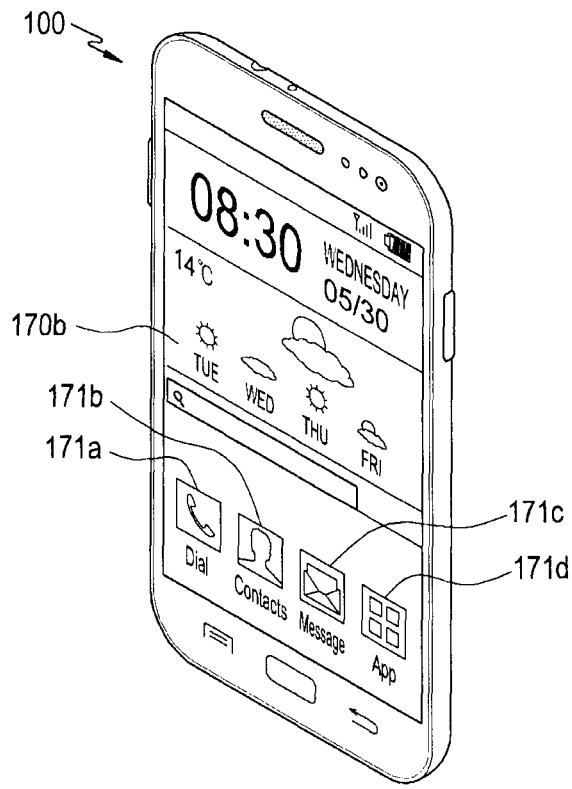
FIG. 48 is a perspective view showing an example of an electronic device according to invention principles.

FIG. 48 shows a front perspective view showing an electronic device including a touch screen 171 disposed on a center of a front surface of an electronic device 100. The touch screen 171 may be formed large enough to occupy the most of the front surface of the electronic device 100. A home screen displayed on the screen of the electronic device 100 may include different home screens over several pages. Among the home screens over the several pages, the first home screen may be a main home screen as shown in FIG. 48. On the home screen are shortcut icons 171a, 171b, and 171c for executing frequently used applications, a main menu switchover key 171d, time and weather. The main menu switchover key 171d displays a menu screen on the touch screen 171. A status bar indicating a status of the electronic device 100, such as a battery charge state, a strength of a received signal, current time, or a volume operation mode, may be formed in an upper end portion of the touch screen 171.

The system be implemented in the form of a program instruction that may be executed by various computer means, and may be recorded on a computer-readable medium. The computer-readable medium may include a program instruction, a data file, or a data structure alone or in combination. The method may be implemented and stored in the form of a program instruction in the storing unit 150 of the electronic device 100, and program instruction may be temporarily stored in the RAM 113 included in the controller 110. Thus, the controller 110 controls hardware components included in the electronic device 100 in response to the program instruction based on the described methods and temporarily or continuously stores data in the storing unit 150. The controller 110 may also provide a User Interface (UI) for presentation on the touch screen controller 172. Information recognized from an image captured by a first electronic device is transmitted to a second electronic device or an information search server, thereby effectively providing detailed information associated with the captured image.

A finger image is detected in a predetermined partial region of an image captured by the first electronic device, thus improving the efficiency of a recognition process, and reducing processing resources, power consumption and processing time. The system provides text scanning with one hand using a wearable device.

The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

What is claimed is:

1. A method for recognizing an object by an electronic device including a camera module, comprising:
   in response to detecting a physical rotation of the camera module from a first position to a second position along a body of the electronic device, activating an object identification mode;
   in response to activation of the object identification mode, capturing an image using the camera module;
   transmitting information recognized from the captured image to an external electronic device communicatively connected with the electronic device via a communication network;
   receiving information associated with the recognized information from the external electronic device; and
   displaying the received information on a display.

2. The method of claim 1, wherein the first position aligns a field of view of the camera module along a first axis parallel to an axis of a wrist-strap of the electronic device, and the second position aligns the field of view of the camera along a second axis capturing a hand of a user wearing the electronic device, and
   recognizing of the information from the captured image further comprising:
      detecting a finger of the hand in a predetermined partial region out of an entire region of the captured image; and
      detecting at least one object in a region of predetermined size located adjacent to a position where the finger is detected in the captured image.

3. The method of claim 2, wherein the predetermined partial region has a predetermined size or direction in the captured image.

4. The method of claim 2, wherein the object is at least one of a barcode, a Quick Response (QR) code, a wine label, a material object, a human body, a face, and feature point information.

5. The method of claim 1, wherein the electronic device is a wearable device wearable on a human body.

6. The method of claim 5, wherein the electronic device is a smart watch or smart glasses.

7. An electronic device, comprising:
   a camera module rotatable along a body of the electronic device;
   a communication module; and
   at least one processor coupled to memory, configured to:
      in response to detecting rotation of the camera module from a first position to a second position along the body of the electronic device, activating an object identification mode,
      in response to activation of the object identification mode, capturing an image using the camera module, transmit, by the communication module, information recognized from the captured image to an external electronic device communicatively connected with the electronic device via a communication network, receive information associated with the recognized information from the external electronic device, and control a display operatively coupled to the electronic device to display the received information.

8. The method of claim 2, wherein the first axis is orthogonal to the second axis.

9. The electronic device of claim 7, wherein the first position aligns a field of view of the camera module along a first axis parallel to an axis of a wrist-strap of the electronic device, and the second position aligns the field of view of the camera along a second axis capturing a hand of a user wearing the electronic device, and recognizing of the information from the captured image further comprises:

detecting a finger of the hand in a predetermined partial region out of an entire region of the captured image; and detecting at least one object in a region of predetermined size located adjacent to a position where the finger is detected in the captured image.

10. The electronic device of claim 9, wherein the first axis is orthogonal to the second axis.

* * * * *